(12) United States Patent
Liu et al.

(10) Patent No.: US 9,594,510 B2
(45) Date of Patent: *Mar. 14, 2017

(54) JBOD SUBSYSTEM AND EXTERNAL EMULATION CONTROLLER THEREOF

(75) Inventors: Ling-Yi Liu, Taipei (TW); Tse-Han Lee, Taipei (TW); Michael Gordon Schnapp, Taipei Hsien (TW); Yun-Huei Wang, Taipei Hsien (TW); Chung-Hua Pao, Taipei Hsien (TW)

(73) Assignee: Infortrend Technology, Inc., New Taipei (TW)

( * ) Notice: Subject to any disclaimer, the term of this patent is extended or adjusted under 35 U.S.C. 154(b) by 174 days.

This patent is subject to a terminal disclaimer.

(21) Appl. No.: 10/709,718

(22) Filed: May 24, 2004

(65) Prior Publication Data

US 2005/0005063 A1    Jan. 6, 2005

Related U.S. Application Data

(60) Provisional application No. 60/483,926, filed on Jul. 2, 2003.

(51) Int. Cl.
*G06F 13/12*  (2006.01)
*G06F 3/06*  (2006.01)

(52) U.S. Cl.
CPC .......... *G06F 3/0607* (2013.01); *G06F 3/0617* (2013.01); *G06F 3/0658* (2013.01); *G06F 3/0664* (2013.01); *G06F 3/0683* (2013.01); *G06F 3/0689* (2013.01)

(58) Field of Classification Search
CPC .. G06F 3/0689; G06F 11/2089; G06F 3/0664; G06F 3/0683; G06F 3/0617; G06F 3/0607; G06F 3/0658; G06F 2211/1035

USPC ............................ 711/162, 165, 114; 710/74
See application file for complete search history.

(56) References Cited

U.S. PATENT DOCUMENTS

| | | | | |
|---|---|---|---|---|
| 6,148,349 A * | 11/2000 | Chow et al. | ..................... | 710/33 |
| 6,178,520 B1 * | 1/2001 | DeKoning et al. | ................ | 714/5 |
| 6,314,460 B1 * | 11/2001 | Knight et al. | ................ | 709/220 |
| 6,397,292 B1 | 5/2002 | Venkatesh | | |
| 6,467,034 B1 * | 10/2002 | Yanaka | ......................... | 711/162 |
| 6,483,107 B1 * | 11/2002 | Rabinovitz et al. | .......... | 250/239 |
| 6,516,370 B1 | 2/2003 | Mulvihill | | |
| 6,532,547 B1 | 3/2003 | Wilcox | | |
| 6,574,709 B1 * | 6/2003 | Skazinski et al. | ............ | 711/119 |
| 6,711,632 B1 * | 3/2004 | Chow et al. | ..................... | 710/29 |
| 6,735,603 B2 * | 5/2004 | Cabrera et al. | ................ | 713/100 |
| 6,845,428 B1 * | 1/2005 | Kedem | ......................... | 711/117 |
| 7,065,661 B2 * | 6/2006 | Borsini et al. | ................ | 713/300 |

(Continued)

*Primary Examiner* — Ernest Unelus
(74) *Attorney, Agent, or Firm* — Winston Hsu; Scott Margo

(57) ABSTRACT

A JBOD subsystem for providing storage to a host entity. The JBOD subsystem contains at least one external JBOD emulation controller coupled to the host entity for emulating IO operations in response to the IO requests and a set of at least one physical storage device coupled to the JBOD emulation controller for providing storage to the host entity through the JBOD emulation controller. The JBOD emulation controller defines at least one logical media unit (LMU) consisting of sections of the set of physical storage device (PSD) and communicates with the PSD through a point-to-point serial-signal interconnect. As an example, the point-to-point serial-signal interconnect can be a Serial ATA IO device interconnect.

75 Claims, 18 Drawing Sheets

(56) References Cited

U.S. PATENT DOCUMENTS

| | | | |
|---|---|---|---|
| 7,068,661 B1* | 6/2006 | Watt et al. | 370/395.31 |
| 7,073,022 B2 | 7/2006 | El-Batal | |
| 7,107,320 B2* | 9/2006 | Busser et al. | 709/213 |
| 7,107,343 B2* | 9/2006 | Rinaldis et al. | 709/225 |
| 7,111,194 B1* | 9/2006 | Schoenthal et al. | 714/6.32 |
| 7,124,265 B2* | 10/2006 | Nagasoe et al. | 711/163 |
| 7,146,521 B1* | 12/2006 | Nguyen | 714/2 |
| 7,246,192 B1 | 7/2007 | Chang | |
| 7,620,790 B1* | 11/2009 | Blumenau | 711/170 |
| 7,681,061 B2* | 3/2010 | Suzuki et al. | 713/340 |
| 2002/0133735 A1* | 9/2002 | McKean et al. | 714/5 |
| 2002/0144044 A1* | 10/2002 | Moon et al. | 710/302 |
| 2003/0033477 A1* | 2/2003 | Johnson et al. | 711/114 |
| 2003/0061264 A1* | 3/2003 | Benhase et al. | 709/105 |
| 2003/0101228 A1* | 5/2003 | Busser et al. | 709/214 |
| 2003/0193776 A1* | 10/2003 | Bicknell et al. | 361/685 |
| 2004/0010660 A1 | 1/2004 | Konshak | |
| 2004/0083308 A1* | 4/2004 | Sebastian et al. | 709/248 |
| 2004/0088482 A1 | 5/2004 | Tanzer | |
| 2004/0117545 A1 | 6/2004 | Borsini | |
| 2004/0123027 A1 | 6/2004 | Workman | |
| 2004/0143694 A1* | 7/2004 | Chen et al. | 710/309 |
| 2004/0177218 A1* | 9/2004 | Meehan et al. | 711/114 |
| 2004/0193791 A1 | 9/2004 | Felton | |
| 2004/0210584 A1* | 10/2004 | Nir et al. | 707/10 |
| 2004/0260873 A1* | 12/2004 | Watanabe | 711/114 |
| 2005/0089027 A1* | 4/2005 | Colton | 370/380 |
| 2005/0114573 A1* | 5/2005 | Chen et al. | 710/74 |
| 2005/0120170 A1* | 6/2005 | Zhu | 711/114 |
| 2005/0160319 A1* | 7/2005 | Marcak et al. | 714/32 |
| 2005/0204078 A1* | 9/2005 | Steinmetz et al. | 710/38 |
| 2005/0223269 A1* | 10/2005 | Stolowitz | 714/6 |
| 2005/0251588 A1 | 11/2005 | Hoch | |
| 2005/0268079 A1* | 12/2005 | Rothman et al. | 713/1 |
| 2006/0129761 A1* | 6/2006 | Guha et al. | 711/114 |
| 2006/0150001 A1* | 7/2006 | Eguchi et al. | 714/6 |
| 2006/0206494 A1 | 9/2006 | Ibrahim | |
| 2007/0220316 A1* | 9/2007 | Guha et al. | 714/6 |

* cited by examiner

| | | | | | | |
|---|---|---|---|---|---|---|
| Reserved (0) | Reserved (0) R I D Reserved (0) FIS Type (41h) | DMA buffer identifier Low | DMA buffer identifier High | Reserved (0) | DMA buffer offset | DMA transfer count | Reserved (0) |
| 0 | 1 | 2 | 3 | 4 | 5 | 6 |

Fig. 11

| | Reserved (0) | Reserved (0) | R R R Reserved (0) | FIS Type (46h) |
|---|---|---|---|---|
| 0 | | | | |
| 1 | | | | |
| ... | N Double-words of data (minimum of one Double-word–maximum of 2048 Double-words) | | | |
| ... | | | | |
| n | | | | |

Fig. 12

JBOD SUBSYSTEM AND EXTERNAL EMULATION CONTROLLER THEREOF

BACKGROUND OF INVENTION

1. Field of the Invention

The invention relates to a JBOD subsystem, and more particularly, to a JBOD subsystem having a plurality of physical storage devices for providing storage to a host entity through an emulation controller.

2. Description of the Prior Art

Storage virtualization is a technology that has been used to virtualize physical storage by combining sections of physical storage devices (PSDs) into logical storage entities, herein referred to as logical media units (LMUs), that are made accessible to a host system. In a LMU, individual storage elements (e.g., storage blocks) are uniquely addressable by a logical storage address. One common example of a LMU is the presentation of the physical storage of a HDD to a host over the host IO-device interconnect. In this case, while on the physical level, the HDD is divided up into cylinders, heads and sectors, what is presented to the host is a contiguous set of storage blocks (sectors) addressed by a single logical block address.

An External (sometimes referred to as "Stand-alone") Storage Virtualization Controller is a Storage Virtualization Controller that connects to the host system via an IO interface and that is capable of supporting connection to devices that reside external to the host system and, otherwise, operates independently of the host. The JBOD emulation controller of the present invention is one example of an external Storage Virtualization Controller.

Traditional JBOD (Just a Bunch Of Drives) subsystems have incorporated Parallel SCSI or Fibre FC-AL physical storage devices (PSDs) because the nature of the interface architecture allows multiple devices to be connected onto a single interconnect. The internal interconnect simply serves as an extension of the interconnect cable that connects the JBOD subsystem to the host.

Please refer to FIG. 1 and FIG. 2. FIG. 1 shows a block diagram of a JBOD subsystem 14 incorporating Parallel SCSI PSDs according to the prior art, while FIG. 2 shows a block diagram of a JBOD subsystem 24 incorporating Fibre FC-AL PSDs according to the prior art. In FIG. 1, a computer system 10 contains a JBOD subsystem 14 having a plurality of Parallel SCSI PSDs 16 for providing storage capacity to a host entity 12. The PSDs 16 (and therefore the subsystem 14) are coupled to the host entity 12 through Parallel SCSI interconnects. Please note here that in this configuration, the host entity 12 is configured to issue IO requests in accordance with the specification of the Parallel SCSI interface standard and, therefore, is capable of accessing the PSDs 16 of the subsystem 14.

Similarly, in FIG. 2 a computer system 20 contains a JBOD subsystem 24 having a plurality of Fibre FC-AL PSDs 26 for providing storage capacity to a host entity 22. The PSDs 26 (and therefore the subsystem 24) are redundantly coupled to the host entity 22 through a pair of Fibre FC-AL interconnects. Please note here that, in this configuration, the host entity 22 is configured to issue IO requests in accordance with the specification of the Fibre FC-AL interface standard and, therefore, is capable of accessing the PSDs 26 of the subsystem 24. In addition, in this configuration, the redundant connection of the PSDs 26 through a pair of Fibre interconnects helps improve the accessibility of the PSDs 26. That is, under the situation that one of the pair of the Fibre interconnects breaks (due to, for example, cable failure or interface circuitry failure), the other Fibre interconnect can still provide the connection needed.

For the JBOD subsystems 14 and 24 in FIG. 1 and FIG. 2, because connection from the host entities 12, 22 to the PSDs is made using multiple device IO device interconnects, i.e., device IO interconnects that support multiple PSDs being coupled to the host entity through a single interconnect, without the need for any extra conversion circuitry. However, because SCSI/Fibre PSDs, especially HDDs, are expensive relative to their lower-end cousins, ATA PSDs, which do not incorporate an IO device interconnect that permits multiple devices to be connected on a single interconnect, the total cost of the JBOD subsystems 14, 24 based on this prior art technology is relatively high.

SUMMARY OF INVENTION

It is therefore a primary objective of the claimed invention to provide a JBOD subsystem capable of incorporating relatively low cost point-to-point serial-signal PSDs, such as Serial ATA PSDs, to solve the above-mentioned problem.

The present JBOD emulation SV subsystem is an application of a general SV subsystem to the specific task of emulating a traditional physical JBOD subsystem. In a traditional JBOD subsystem, the ability to remove failed PSDs and insert new PSDs in their place while the subsystem remains on line is an essential characteristic. This translates into the ability to dynamically take logical media units off line and bring others on line in the context of the present JBOD emulation SV subsystem. Therefore, an essential distinguishing characteristic of the present JBOD emulation SV subsystem, is its ability, while the system remains on-line, to take logical media units together with their associated PSDs off line, as when associated PSDs are removed from the JBOD subsystem, and scan for and bring on line logical media units that are made up of PSDs that are dynamically brought on line, as when the associated PSDs are inserted into the JBOD. A typical JBOD emulation SV subsystem would simply map a single PSD to a single logical media unit in a one to one fashion.

According to the claimed invention, a JBOD subsystem for providing storage to a host entity is disclosed. The JBOD subsystem contains an external JBOD emulation controller coupled to the host entity for emulating IO operations in response to IO requests issued by the host and a plurality of physical storage devices coupled to the JBOD emulation controller for providing storage to the host entity through the JBOD emulation controller.

The external JBOD emulation controller for emulating IO operations in response to an IO requests issued by a host entity is also disclosed. The JBOD emulation controller contains at least one host-side IO device interconnect controller coupled to the host entity, a central processing circuit coupled to the host-side IO device interconnect controller for performing IO operations in response to the IO request of the host entity, and at least one device-side IO device interconnect controller coupled to the central processing circuit for performing point-to-point serial signal transmission with a plurality of physical storage devices. In one embodiment, the device-side point-to-point serial-signal IO device interconnect is a Serial ATA IO device interconnect.

It is an advantage of the present invention JBOD subsystem to utilize relatively low-cost point-to-point serial-signal PSDs, such as Serial ATA HDDs, to provide storage capacity to a host entity while performing the functionalities of a conventional JBOD subsystem, for example, JBOD subsystems incorporating Parallel SCSI or Fibre PSDs.

These and other objectives of the claimed invention will no doubt become obvious to those of ordinary skill in the art after reading the following detailed description of the preferred embodiment that is illustrated in the various figures and drawings.

BRIEF DESCRIPTION OF DRAWINGS

FIG. 11 illustrates a first FIS data structure complying with serial ATA protocol.

FIG. 12 illustrates a second FIS data structure complying with serial ATA protocol.

DETAILED DESCRIPTION

Figure 1:
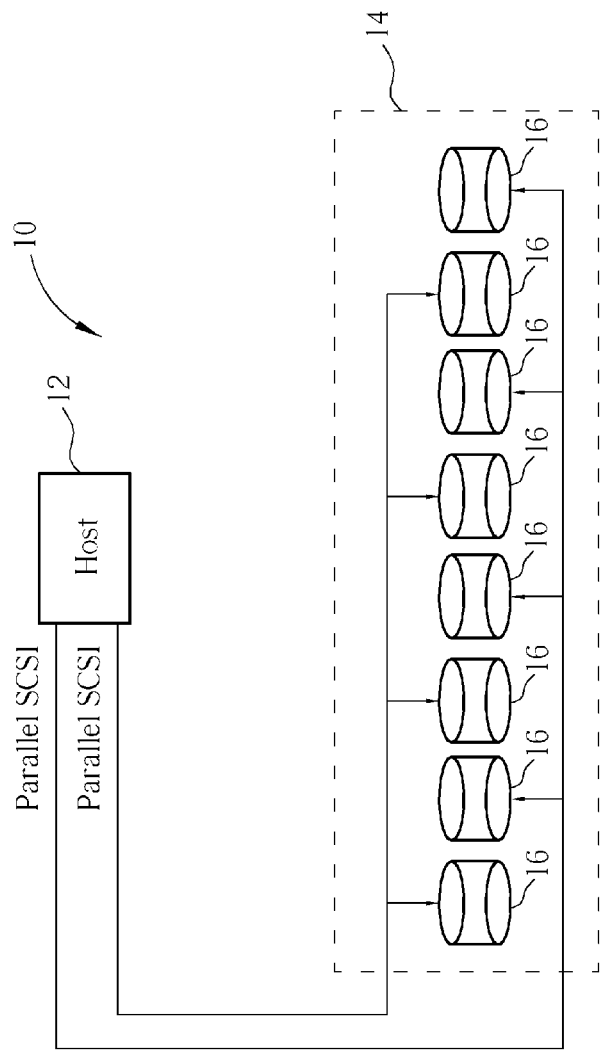
FIG. 1 is a block diagram of a JBOD subsystem incorporating Parallel SCSI PSDs according to the prior art.
Figure 2:
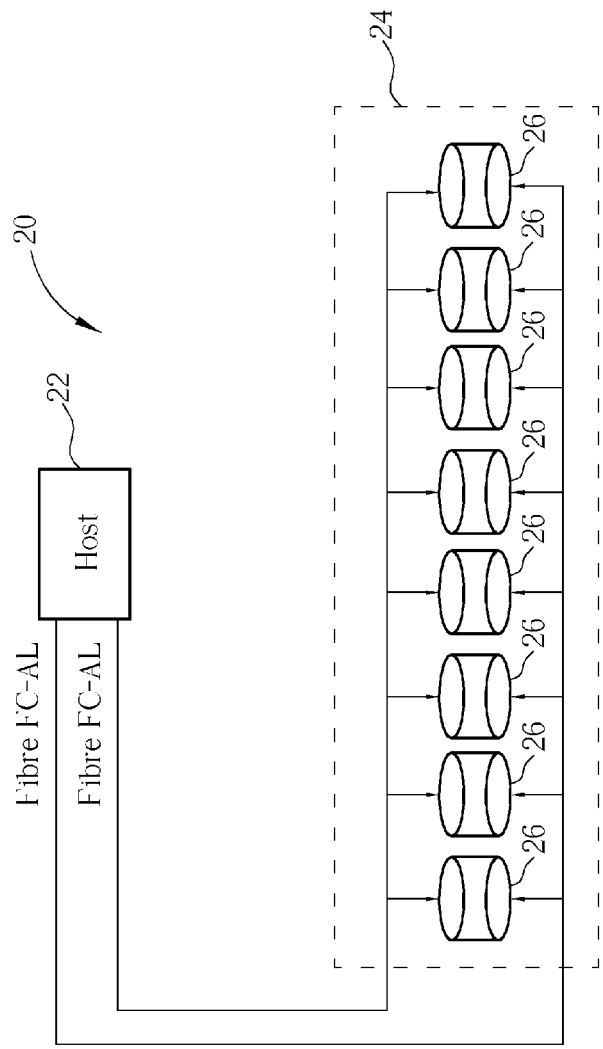
FIG. 2 is a block diagram of a JBOD subsystem incorporating Fibre FC-AL PSDs according to the prior art.
Figure 3:
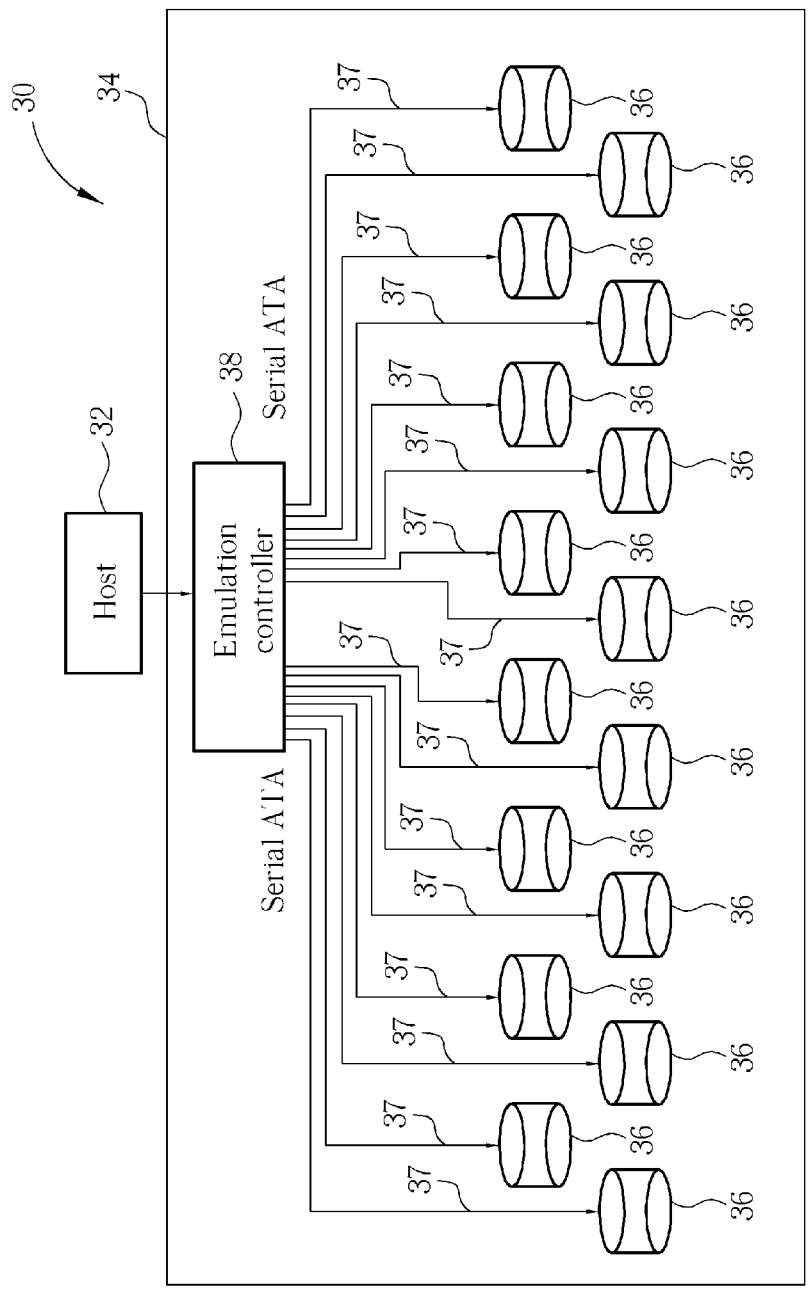
FIG. 3 is a block diagram of a computer system containing a JBOD subsystem according to the present invention.

Please refer to FIG. 3. FIG. 3 shows a block diagram of a computer system 30 containing a JBOD subsystem according to the present invention. The computer system 30 comprises a host entity 32 for which the JBOD subsystem is providing storage, a JBOD emulation controller 38 coupled to the host entity 32 for emulating IO operations in response to IO requests issued by the host entity 32, and a plurality of physical storage devices 36 coupled to the JBOD emulation controller for providing the storage media to which the host entity 32 is stored data. The physical storage devices 36 are connected to the JBOD emulation controller 38 by Serial ATA IO device interconnects 37. The host entity 32 can be a host computer, such as a server system, a workstation, a PC system, or the like. Alternatively, the host entity 32 can be a Storage Virtualization System.

In FIG. 3, the JBOD emulation controller 38 and the plurality of physical storage devices (PSDs) 36 together are referred to as a JBOD subsystem 34 because the JBOD emulation controller 38 and the PSDs 36 are designed to emulate the functionalities of a conventional JBOD subsystem with respect to the host entity 32. Please note that in the setting of the present invention, the host entity 32 can be configured to issue IO requests in accordance with the host interconnect protocol standard, such as Parallel SCSI or Fibre, accompanied by an interconnect between the host entity 32 and the JBOD subsystem 34. The JBOD emulation controller 38 is capable of performing operations to emulate the functionalities of an ordinary JBOD subsystem such that the host entity 32 believes that it is communicating with an ordinary JBOD subsystem. The JBOD emulation controller 38 implements and/or emulates a set of host-issuable commands and host-side operations that allow the JBOD emulation controller 38 to be viewed upon and handled by the host as though it were a set of actual PSDs of the type it is designed to emulate.

For the purpose of the present invention, the plurality of PSDs 36 are implemented by using relatively low-cost point-to-point serial-signal PSDs. Consequently, each of the PSDs 36 is coupled to the JBOD emulation controller 38 through a point-to-point serial-signal interconnect. In this preferred embodiment, the point-to-point serial-signal interconnect is a Serial ATA IO device interconnect and the PSD 36 is a Serial ATA hard disk drive (HDD). In another embodiment, the PSD 36 can also be a Parallel ATA HDD connected to the Serial ATA IO device interconnect through a Serial ATA bridge equipped with a protocol converter capable of translating Parallel ATA signals to/from Serial ATA signals.

Figure 4:
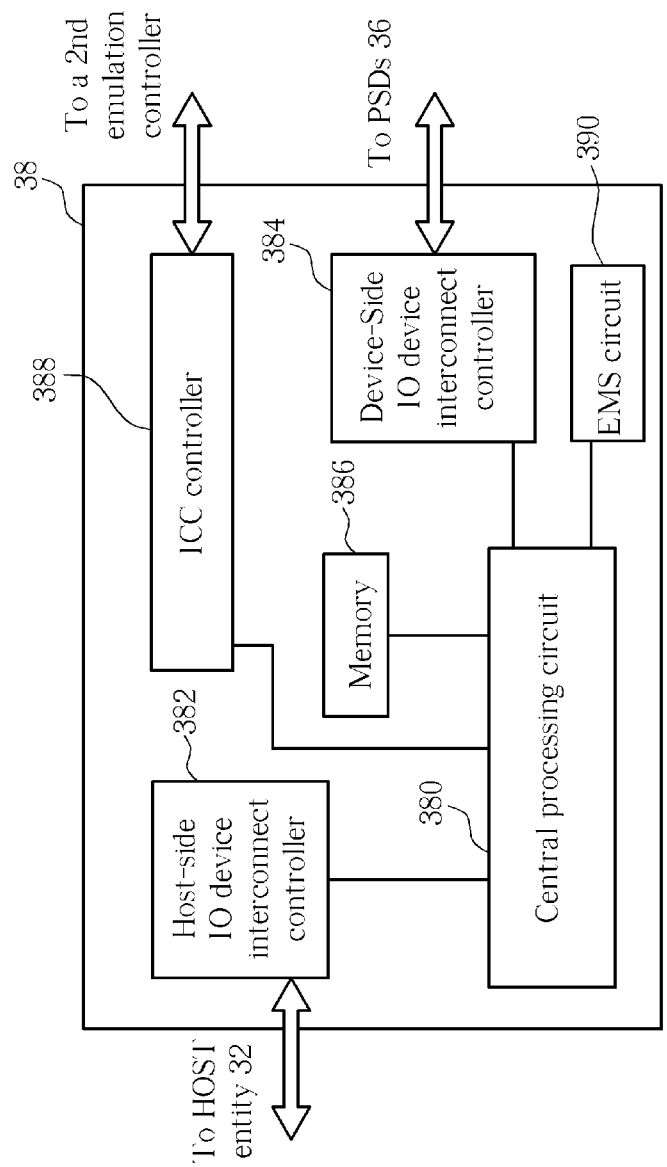
FIG. 4 is a block diagram of an external JBOD emulation controller in FIG. 3 according to the present invention.

Now please refer to FIG. 4. FIG. 4 shows a block diagram of the JBOD emulation controller 38 in FIG. 3 according to an embodiment of the present invention. A JBOD emulation controller 38 for emulating IO operations in response to IO requests issued by a host entity 32 is shown. The JBOD emulation controller 38 comprises at least one host-side IO device interconnect controller 382 coupled to the host entity 32, a central processing circuit 380 coupled to the host-side IO device interconnect controller 382 for performing IO operations in response to the IO request of the host entity 32, and at least one device-side IO device interconnect controller 384 (in FIG. 4, a Serial ATA IO device interconnect controller) coupled to the central processing circuit 380 for performing point-to-point serial signal transmission with a plurality of PSDs 36.

In FIG. 4, the preferred embodiment of the present invention JBOD emulation controller 38 also comprises a memory 386 coupled to the central processing circuit (CPC) 380 for buffering the CPC 380. In a redundant embodiment, the JBOD emulation controller 38 further comprises an inter-controller communication channel (ICC) controller 388 coupled to the CPC 380 for connecting the CPC 380 to a second JBOD emulation controller (not shown). In this configuration, the control/data information from the host entity 32 can be transferred from the CPC 380 through the ICC controller 388 to the second JBOD emulation controller. This redundancy of the JBOD emulation controllers provides more robust accessibility of the PSDs. In an embodiment in which the functionality of a pair of redundant controllers is not pursued, the ICC controller 388 can be omitted. Moreover, in another optional embodiment, the JBOD emulation controller also comprises an enclosure management service (EMS) circuit 390 coupled to the CPC 380 for executing the function of the enclosure management service 390.

In FIG. 4, the host-side IO device interconnect controller 382 is connected to the host entity 32 and the CPC 380 to serve as an interface and buffer between the JBOD emulation controller 38 and the host entity 32, and receives IO requests and related data from the host entity 32 and maps and/or transfers them to the CPC 380. The host-side IO device interconnect controller 382 comprises one or more host-side ports for coupling to the host entity 32. Some common port types that might be incorporated here are: Fibre Channel supporting Fabric, point-to-point, public loop and/or private loop connectivity in target mode, parallel SCSI operating in target mode, ethernet supporting the iSCSI protocol operating in target mode, Serial-Attached SCSI (SAS) operating in target mode, and Serial ATA operating in target mode.

When the CPC 380 receives the IO requests of the host entity 32 from the host-side IO device interconnect controller 382, the CPC 380 parses it and performs some operations in response to the IO requests and sends the data requested and/or reports and/or information from the JBOD emulation controller 38 back to the host entity 32 through the host-side IO device interconnect controller 382.

After parsing a request received from the host entity 32, while a read request is received, and performing one or more operations in response, the CPC 380 gets the requested data either internally or from the memory 386 or in both ways and transfers them to the host entity 32. If the data is not available either internally or does not exist in the memory 386, an IO request will be issued to the PSDs 36 through the device-side IO device interconnect controller 384 and the requested data will be transferred from the PSDs to memory 386 and then passed to the host entity 32 through the host-side IO device interconnect controller 382.

When a write request is received from the host entity 32, after parsing the request and performing one or more operations, the CPC 380 gets the data from the host entity 32 through the host-side IO device interconnect controller 382, stores them to the memory 386 and then transfers them to the PSDs 36 through the CPC 380. When the write request is a write back request, the IO complete report can be issued to the host entity 32 first and then the CPC 380 performs the actual write operation later; otherwise, an IO complete report is issued to the host entity 32 after the requested data is actually written into the PSDs 36.

The memory 386 is connected to the CPC 380 and acts as a buffer to buffer the data transferred between the host entity 32 and the PSDs 36 passing the CPC 380. In one embodiment, the memory 386 can be a DRAM; more particularly, the DRAM can be a SDRAM.

The device-side IO device interconnect controller 384 is a Serial ATA IO device interconnect controller connected to the CPC 380 and the PSDs 36. The device-side IO device interconnect controller 384 is an interface and buffer between the JBOD emulation controller 38 and the PSDs 36, and receives IO requests and related data issued from the CPC 380 and maps and/or transfers them to the PSDs 36. The device-side IO device interconnect controller 384 reformats the data and control signals received from the CPC 380 to comply with Serial ATA protocol and transmits them to the PSDs 36.

According to an alternative implementation, the device-side IO device interconnect controller 384 can be connected to the PSDs through a switching circuit implemented on a backplane (not shown) to facilitate the attachment and removal of the JBOD emulation controllers and/or the PSDs 36.

When one of the PSDs 36 receives the IO requests from the CPC 380 through the device-side IO device interconnect controller 384, that PSD 36 performs some operations in response to the IO requests and transfers the requested data and/or reports and/or information to and/or from the CPC 380.

Figure 5:
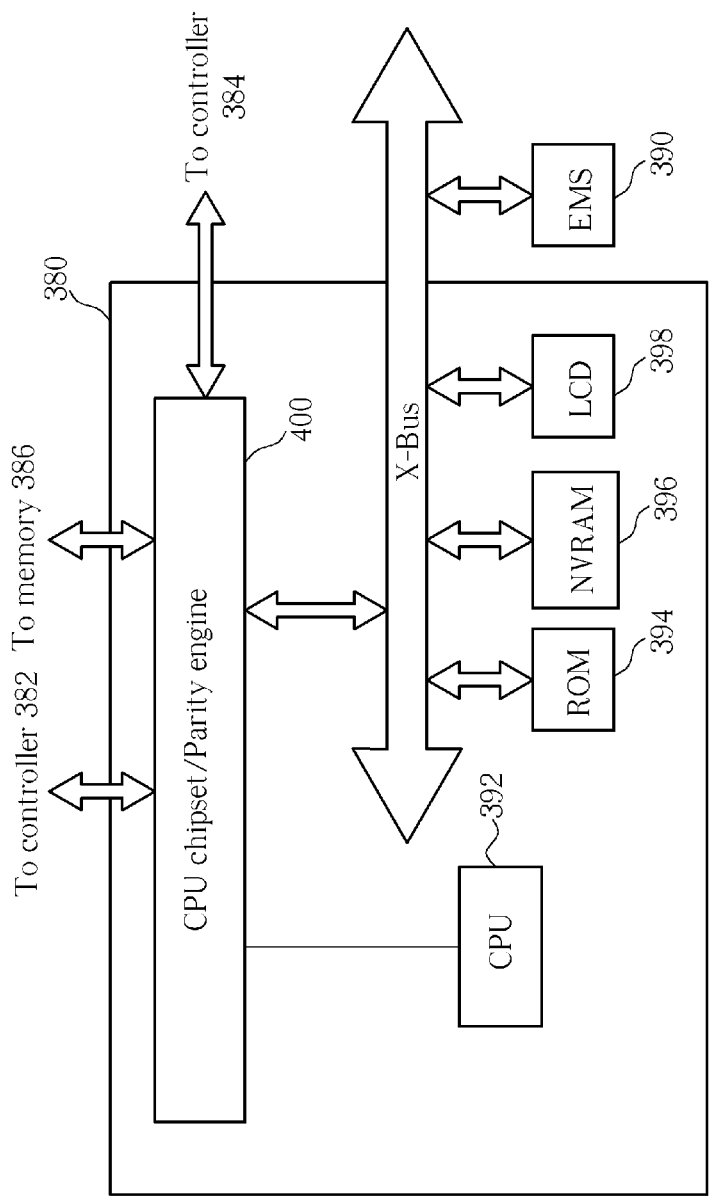
FIG. 5 is a block diagram of a central processing circuit in FIG. 4 according to the present invention.

Please refer to FIG. 5. FIG. 5 shows a block diagram of the CPC 380 in FIG. 4 according to an embodiment of the present invention and the connection thereof to other functional blocks of the JBOD emulation controller 38. In FIG. 5, the CPC 380 comprises a CPU chipset/parity engine 400, a CPU 392, a ROM (Read Only Memory) 394, an NVRAM (Non-volatile RAM) 396, and an LCD module 398. The CPU 392 can be, e.g., a Power PC CPU. The ROM 394 can be a FLASH memory for storing BIOS and/or other programs. The NVRAM 396 is provided for storing configuration and operational state information. The LCD module 398 shows the operation status of the subsystem 34. The NVRAM 396 and the LCD module 398 are optional. The ROM 394, the NVRAM 396, the LCD module 398, and the EMS circuit 390 are all connected to the CPU chipset/parity engine 400 through an X-bus.

Please note that in other embodiments of the present invention, the parity function of the CPU chipset/parity engine 400 can also be implemented with a separate chip, i.e., a CPU chipset chip and a parity engine chip, or be implemented with the CPU accompanied by parity function program codes rather than dedicated hardware. Moreover, the present invention CPC 380 can also incorporate a data protection engine providing data protection functions such as an error correcting code (ECC) function in place of the parity engine. Furthermore, when the parity function is not required, the parity engine/parity function can be omitted. Other variations and/or modifications which can be easily made by those skilled in the art, should be considered as a portion of the present invention.

Figure 6:
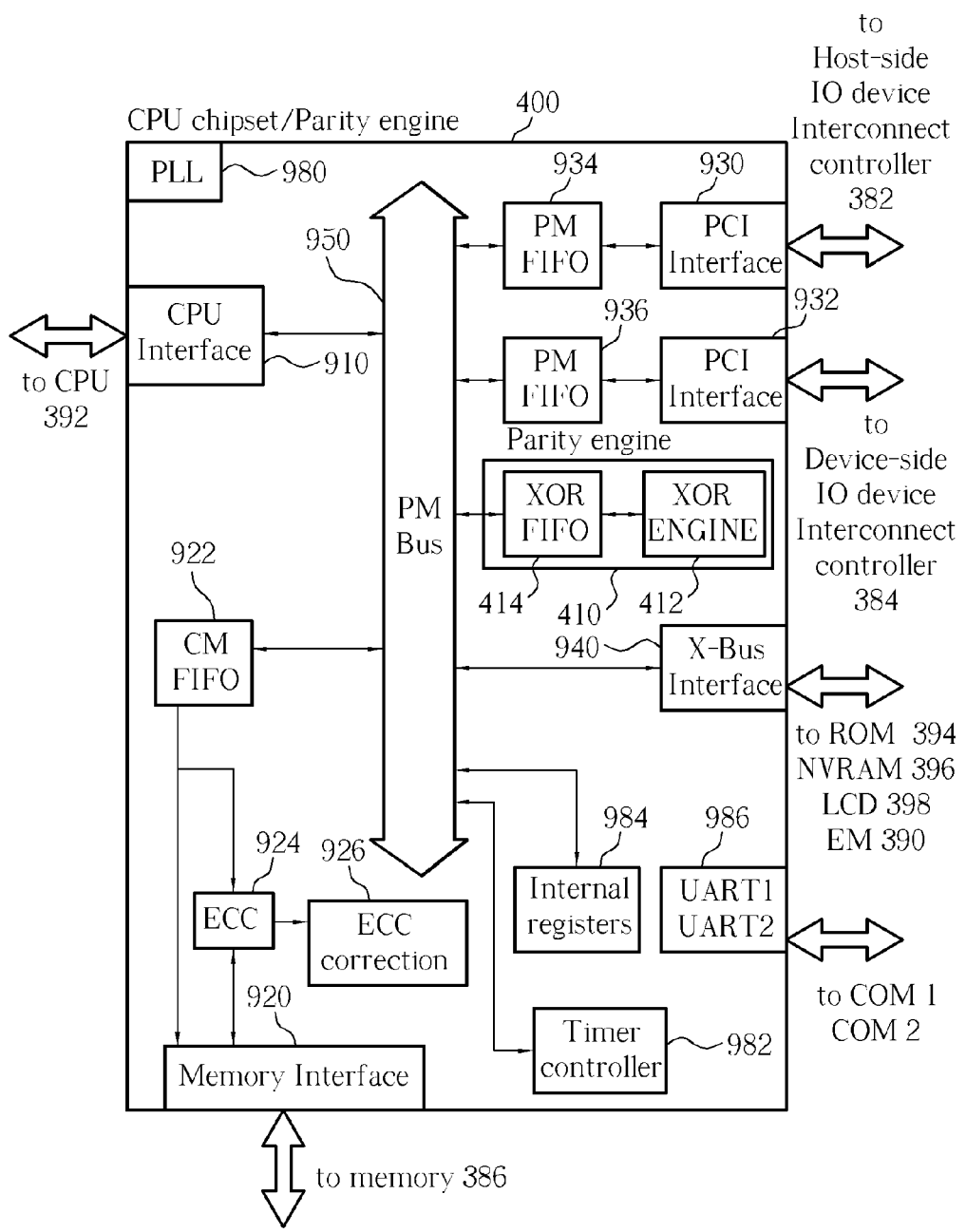
FIG. 6 is a block diagram of a CPU chipset/parity engine in FIG. 5 according to the present invention.

FIG. 6 is a block diagram of the CPU chipset/parity engine 400 in FIG. 5 according to the present invention. In the present embodiment, the CPU chipset/parity engine 400 comprises a parity engine 410, a CPU interface 910, a memory interface 920, PCI interfaces 930, 932, an X-bus interface 940, and a PM bus 950. The PM bus 950 is, for example, a 64-bit, 133 Mhz bus and connects the parity engine 410, the CPU interface 910, the memory interface 920, the PCI interfaces 930, 932, the X-bus interface 940 altogether for communicating data signals and control signals among them.

Data and control signals from host-side IO device interconnect controller 382 enter the CPU chip/parity engine 400 through the PCI interface 930 and are buffered in a PM FIFO 934. The PCI interface 930 to the host-side IO device interconnect controller 382 can be, for example, of a bandwidth of 64-bit, 66 Mhz. When in the PCI slave cycle, the PCI interface 930 owns the PM bus 950 and the data and control signals in the PM FIFO 934 are then transmitted to either the memory interface 920 or to the CPU interface 910.

The data and control signals received by the CPU interface 910 from PM bus 950 are transmitted to CPU 392 for further treatment. The communication between the CPU interface 910 and the CPU 392 can be performed, for example, through a 64 bit data line and a 32 bit address line. The data and control signals can be transmitted to the memory interface 920 through a CM FIFO 922 of a bandwidth of 64 bit, 133 MHz.

An ECC (Error Correction Code) circuit 924 is also provided and connected between the CM FIFO 922 and the memory interface 920 to generate ECC code. The ECC code can be generated, for example, by XORing 8 bits of data for a bit of ECC code. The memory interface 920 then stores the data and the ECC code to the memory 386, for example, an SDRAM. The data in the memory 386 is transmitted to the PM bus 950 through an ECC correction circuit 926 and compared with the ECC code from the ECC circuit 924. The ECC correction circuit 926 has the functionality of one-bit auto-correcting and multi-bit error detecting.

The parity engine 410 can perform parity functionality in response to the instruction of the CPU 392. In this embodiment as shown in the FIG. 6, the parity engine 410 can include an XOR engine 412 to connect with the PM bus 950 through XOR FIFO 414. The XOR engine 412 can perform, for example, the XOR function for a memory location with given address and length of the location. Of course, the parity engine 410 can be shut off and perform no parity functionality at all in certain situations. Moveover, when the parity function is not required, the parity engine 410 can be omitted.

A PLL (Phase Locked Loop) 980 is provided for maintaining desirable phase shifts between related signals. A timer controller 982 is provided as a timing base for various clocks and signals. Internal registers 984 are provided to register status of the CPU chip/parity engine 400 and for controlling the traffic on the PM bus 950. In addition, a pair of UART functionality blocks 986 are provided so that the CPU chip/parity engine 400 can communicate with outside devices through the RS232 interface.

In an alternative embodiment, PCI-X interfaces can be used in place of the PCI interfaces 930, 932. Those skilled in the art will know such replacement can be easily accomplished without any difficulty. In another alternative embodiment, PCI Express interfaces can be used in place of the PCI interfaces 930, 932. Those skilled in the art will know such replacement can be easily accomplished without any difficulty.

Figure 7:
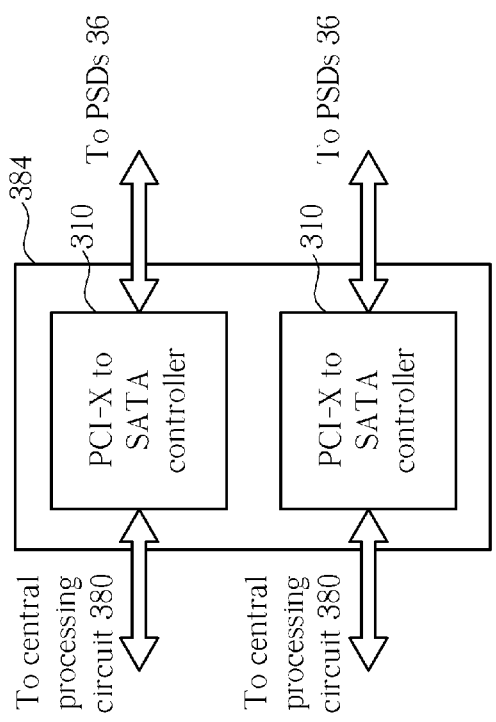
FIG. 7 is a block diagram of a device-side IO device interconnect controller in FIG. 4 according to the present invention.

FIG. 7 is a block diagram of the device-side IO device interconnect controller 384 in FIG. 4. According to the present embodiment, the device-side IO device interconnect controller 384 comprises two PCIX to SATA controllers 310. Through an SATA port of the PCIX to SATA controller 310, the data and control signals are transmitted to one of the PSDs 36.

Figure 8:
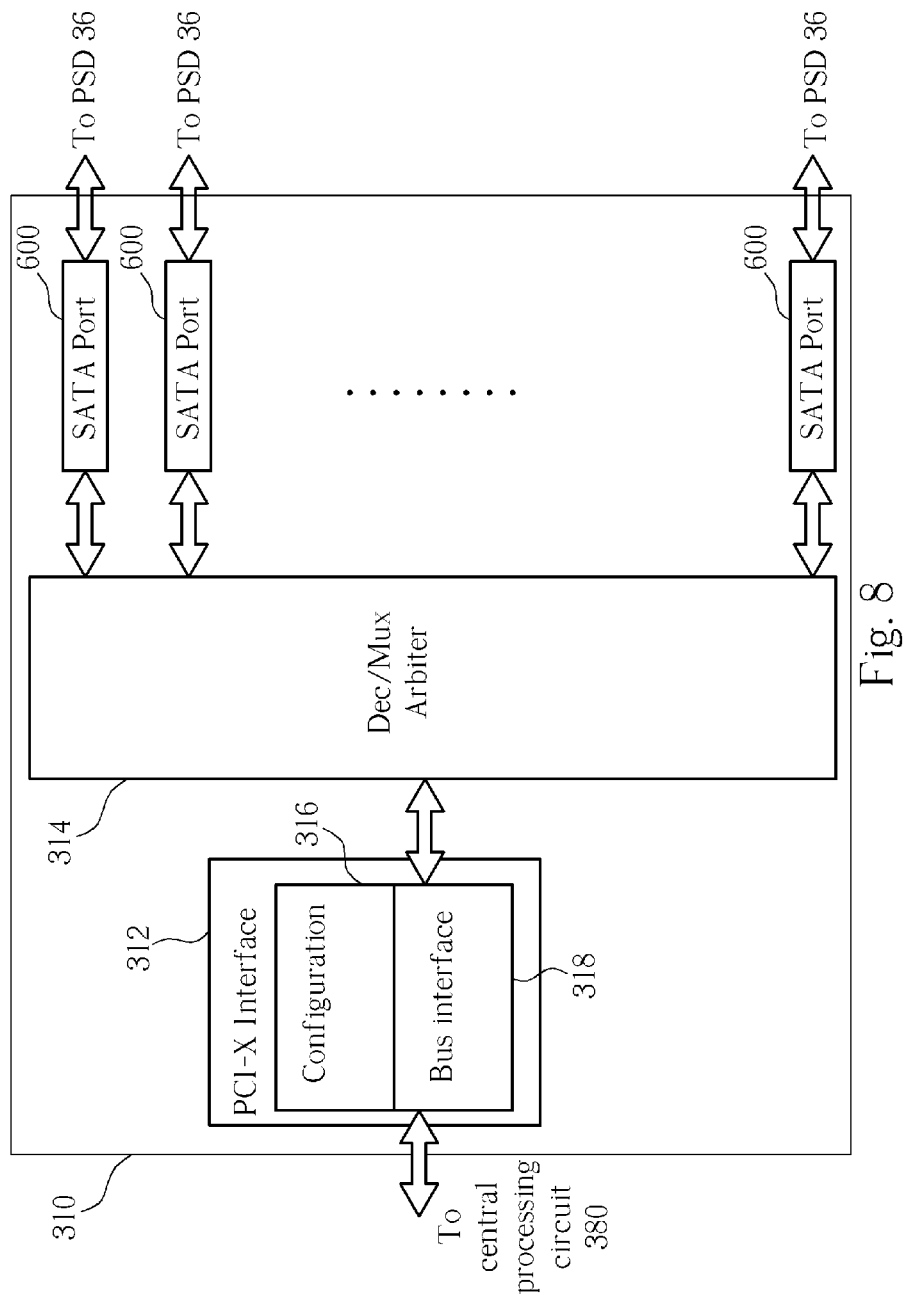
FIG. 8 is a block diagram of a PCI-X to SATA controller in FIG. 7 according to the present invention.

FIG. 8 is a block diagram of the PCI-X to SATA controller 310 in FIG. 7. As shown in FIG. 8, each PCIX to SATA controller 310 contains a PCIX Interface 312 connected to the CPC 380, a Dec/Mux Arbiter 314 connected to the PCI-X interface 312, and 8 SATA Ports 600 connected to the Dec/Mux Arbiter 314. The PCI-X interface 312 comprises a bus interface 318 connecting to the dec/mux arbiter 314 and a configuration circuitry 316 storing the configuration of the PCIX to SATA controller 310. The dec/mux arbiter 314 performs arbitration between the PCI-X interface 312 and the plurality of SATA ports 600 and address decoding of the transactions from the PCI-X interface 312 to the SATA ports 600. In an alternative embodiment, a PCI to SATA controller (not shown) can be used in place of the PCI-X to SATA controller 310. In the PCI to SATA controller, a PCI interface (not shown) is used in place of the PCI-X interface 312. Those skilled in the art will know such replacement can be easily accomplished without any difficulty. In another alternative embodiment, a PCI Express to SATA controller can be used in place of the PCI-X to SATA controller 310. In the PCI Express to SATA controller, a PCI Express interface is used in place of the PCI-X interface 312. Those skilled in the art will know such replacement can be easily accomplished without any difficulty.

Figure 9:
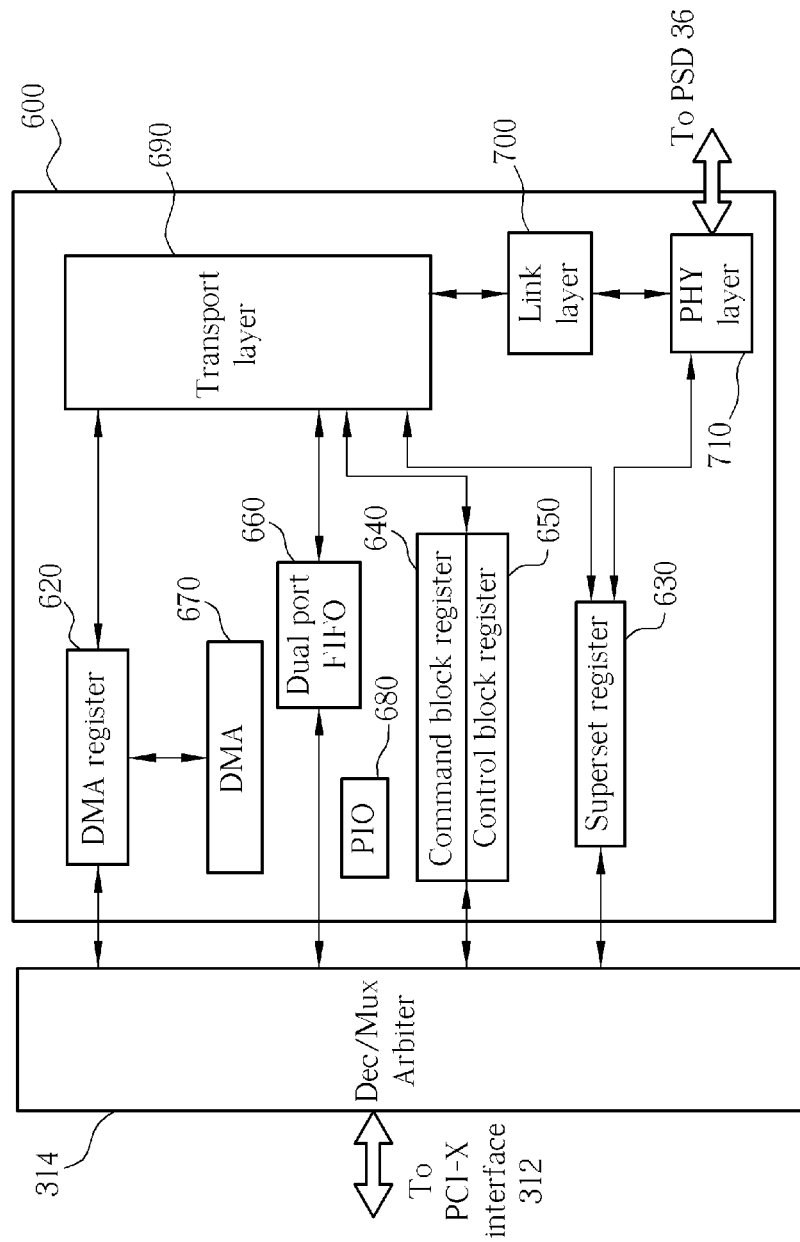
FIG. 9 is a block diagram of a SATA port in FIG. 8 according to the present invention.

FIG. 9 is a block diagram of the SATA port 600 of FIG. 8. As shown in FIG. 9, each SATA port 600 comprises a superset register 630, a command block register 640, a control block register 650, and a DMA register 620, all connected to a bus interface. By filling these registers, data will be transferred between the dec/mux arbiter 314 and a transport layer 690 through a dual port FIFO 660 under the control of a DMA controller 670. The information received by the transport layer 690 will be re-formatted into an FIS primitive and transmitted to a link layer 700.

The link layer 700 is then to re-format the FIS into a frame by adding SOF, CRC, EOF, etc., thereto and performing 8b/10b encoding into encoded 8b/10b characters and transmits it to a PHY layer 710.

The PHY layer 710 will transmit signals through a pair of differential signal lines, transmission lines LTX+, LTX−, to send and receive signals through another pair of differential signal lines, reception lines LRX+, LRX−, from the PSD controller in the PSD 36. The two signal lines of each pair of the signal lines, for example LTX+/LTX−, transmit signals TX+/TX− simultaneously at inverse voltage, for example, +V/−V or V/+V, with respective to a reference voltage Vref so that the voltage difference will be +2v or 2V and thus enhances the signal quality thereof. This is also applicable to the transmission of the reception signals RX+/RX− on reception lines LRX+, LRX−.

When receiving a frame from the PHY layer 710, the Link layer 700 will decode the encoded 8b/10b characters and remove the SOF, CRC, EOF. A CRC will be calculated over the FIS to compare with the received CRC to ensure the correctness of the received information.

When receiving an FIS from the Link layer 700, the transport layer 690 will determine the FIS type and distribute the FIS content to the locations indicated by the FIS type.

Figure 10:
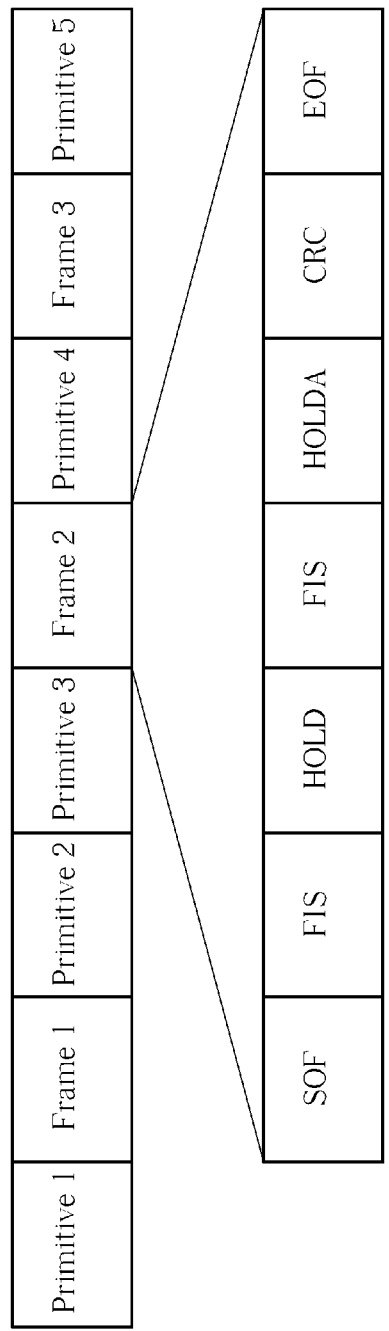
FIG. 10 illustrates the transmission structure complying with serial ATA protocol.

A transmission structure complying with serial ATA protocol is shown in FIG. 10. The information communicated on the serial line is a sequence of 8b/10b encoded characters. The smallest unit thereof is a double-word (32 bits). The contents of each double-word are grouped to provide low-level control information or to transfer information between a host and an device connected thereto. Two types of data structures transmitted on signal lines are primitives and frames.

A primitive consists of a single double-word and is the simplest unit of information that may be communicated between a host and a device. When the bytes in a primitive are encoded, the resulting pattern is not easy to be misinterpreted as another primitive or a random pattern. Primitives are used primarily to convey real-time state information, to control the transfer of information and to coordinate communication between the host and the device. The first byte of a primitive is a special character.

A frame consists of a plurality of double-words, and starts with an SOF (Start Of Frame) primitive and ends with an EOF (End Of Frame) primitive. The SOF is followed by a user payload called a FIS (Frame Information Structure). A CRC (Cyclic-Redundancy Check Code) is the last non-primitive double-word immediately proceeding the EOF primitive. The CRC is calculated over the contents of the FIS. Some other flow control primitives (HOLD or HOLDA) are allowed between the SOF and EOF to adjust data flow for the purpose of speed matching.

The transport layer constructs FIS's for transmission and decomposes FIS's received from the link layer. The transport layer does not maintain context of ATA commands or previous FIS content. As requested, the transport layer constructs an FIS by gathering FIS content and placing them in proper order. There are various types of FIS, two of which are shown in FIG. 11 and FIG. 12.

As shown in FIG. 11, a DMA setup FIS contains a HEADER in field 0. The first byte (byte 0) thereof defines the FIS type (41h), and the FIS type defines the rest fields of this FIS and defines the total length of this FIS as seven double-words. Bit D in byte 1 indicates the direction of the subsequent data transfer. D=1 means transmitter to receiver; D=0 means receiver to transmitter. Bit I in byte 1 is an interrupt bit. Bit R in byte 1 is a reserved bit and set to 0. DMA buffer identifier low/high field (field 1) indicates the DMA buffer region in the host memory. DMA buffer offset field (field 4) is the byte offset into the buffer. DMA transfer count field (field 5) is the number of bytes that will be read or written by the device.

As shown in FIG. 12, a DATA FIS contains a HEADER in field 0. The first byte (byte 0) thereof defines the FIS type (46 h), and the FIS type defines the rest fields of this FIS and defines the total length of this FIS as n+1 double-words. The R bits in byte 1 are reserved bits and set to 0. The fields 1 through n are double-words of data, which contain the data to transfer. The maximum amount of a single DATA FIS is limited.

The device-side IO request information that defines the parameters of the IO operation (e.g., destination, media section base address, media section length, etc.) is packaged into a packet format compliant with serial ATA protocol such as a frame. Since a frame comprises an FIS and a CRC calculated over the contents of the FIS, all IO request information communicated between the CPC 380 and the PSD 36 through the PCIX to SATA Controller 310 will be CRC checked. Hence, inadvertent data corruption (e.g. due to noise) during the transfer from the JBOD emulation controller 38 to the PSD 36 may be detected and recovered, preventing a potential catastrophic data corruption situation in which data gets written to the wrong section of media possibly due to corruption of the destination media section base address and/or media section length that are contained in the initial 10 request data.

Under the configuration illustrated in FIG. 3 through FIG. 12, the present invention JBOD emulation controller 38 in conjunction with the PSDs 36 is capable of providing storage capacity to the host entity 32, and performing the functionalities of a JBOD subsystem, which will be described in more detail in following paragraphs.

The present invention JBOD emulation controller 38 can parse an IO request received from the host entity 32 and perform IO operations corresponding thereto to access one or more of the LMUs by accessing at least one of the PSDs 36 through at least one device-side 10 device interconnect in a point-to-point serial signal transmission.

IO requests received over the host-side IO device interconnect are either directly processed by the JBOD emulation controller 38 as in IO requests that generate internally-emulated operations, indirectly generate accesses to the addressed PSD 36 as in IO requests that generate asynchronous device operations, or directly generate accesses to the addressed PSD 36 as in IO requests that generate synchronous device operations.

Examples of IO requests that generate internally-emulated operations might be commands that request configuration information, such as LMU identifiers or total capacity. IO requests that typically might generate asynchronous-device operations are cacheable read commands for which requested data currently resides in the cache (for example, the memory 386) and write commands when write-back functionality is supported and engaged. IO requests that typically might generate synchronous-device operations are cacheable reads for which requested data does not all currently reside in cache, write commands when write-back functionality is not engaged, or read/write commands that force media access.

The present invention JBOD emulation controller 38, while the system remains on-line, is capable of taking LMUs together with their associated PSDs 36 off line so that these PSDs 36 can be physically removed from the subsystem 34, and scanning for and bringing on line LMUs when component PSDs 36 have been physically inserted into the JBOD subsystem 34. In the simplest case, in which each LMU comprises a single PSD 36, this can be easily done automatically with the help of circuitry and/or device-side IO device interconnect protocol facilities for determining whether a PSD 36 is present and/or connected.

Figure 13:
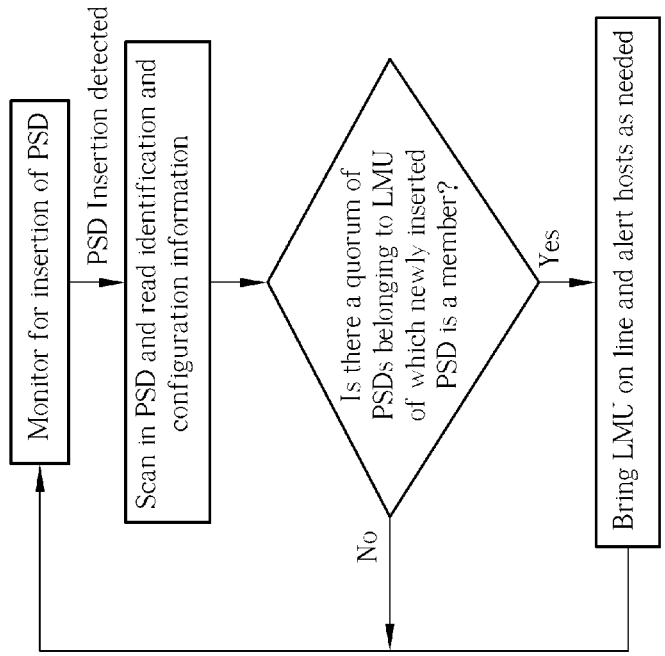
FIG. 13 is a flow of an automated procedure to monitor for PSDs being inserted and bringing a LMU on line.
Figure 14:
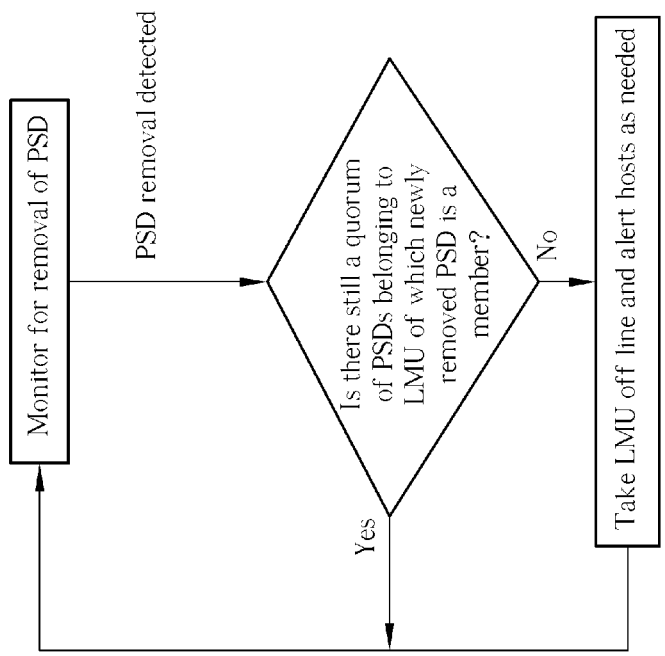
FIG. 14 is a flow of an automated procedure to monitor for the removal of PSDs and taking a LMU off line.

This "plug-and-play" characteristic of the present invention JBOD emulation controller 38 depicted above helps minimize or eliminate the need for manual intervention to bring LMUs on line upon insertion of component PSD(s) 36 and take LMUs off line when PSD(s) 36 are to be removed. Please refer to FIG. 13 and FIG. 14. FIG. 13 is a sample flow of an automated procedure to monitor for PSDs 36 being inserted and bringing an LMU on line once a quorum of member drives are present. FIG. 14 is a sample flow of an automated procedure to monitor for the removal of PSDs 36 and taking an LMU off line when a quorum of member drives is no longer present. A quorum herein means a group of one or more member drives of an LMU to which data can be accessed correctly by the subsystem. For example, in RAID 0, a quorum comprises all the member disk drives of an LMU; in RAID 1, a quorum comprises at least one of the mirrored disk drive pair in every mirrored disk drive pair of an LMU; and, in RAID 3 through 5, a quorum comprises at least all but one of the member disk drives of an LMU.

Figure 15:
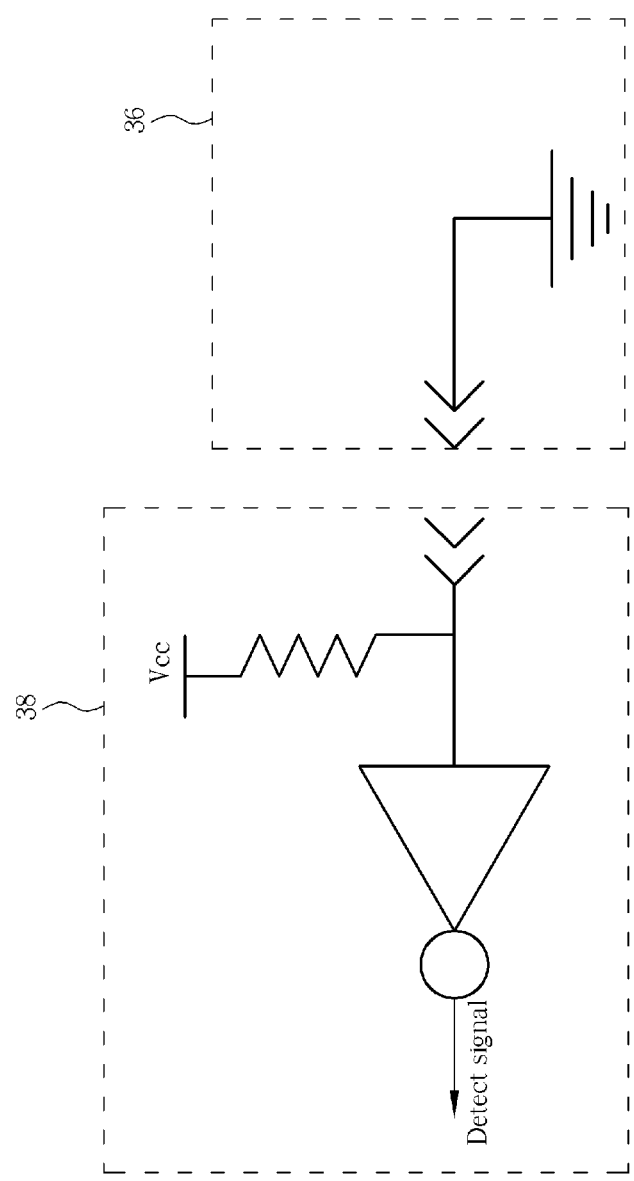
FIG. 15 is a circuit diagram of a detector dedicated to monitoring the insertion and removal of PSDs.

An important enabling element of the automated on-lining and off-lining of LMUs in response to PSD insertions/removals is a facility for detecting if a PSD 36 is inserted/removed into/from the JBOD enclosure. FIG. 15 shows an example of such a detection facility. The JBOD emulation controller 38 monitors the state of this detection facility to determine when a PSD 36 is removed or inserted. In the simplest case, in which each logical media unit is composed of a single PSD, removal of the PSD will trigger the initiation of the procedure that takes the corresponding logical media unit off line, while insertion will trigger the procedure to scan in and then bring on line the corresponding logical media unit.

In order to support the above-mentioned features of the present invention JBOD subsystem, the JBOD subsystem can further comprises an auto-on-lining mechanism to automatically bring on line a said logical media unit which was previously off-line once a requisite quorum of said PSDs comes on-line, an auto-off-lining mechanism to automatically take off line a said logical media unit which was previously on-line once a requisite quorum of said PSDs becomes off-line, a determining mechanism for automatically determining when a PSD has been removed or when one has been inserted, and a scanning-in mechanism to automatically scan in PSDs on detection of insertion of the PSD.

Functionality designed to minimize manual intervention would typically include mechanisms that allow the host to automatically discover that new logical media units have been made accessible on the host-side IO device interconnects so it can automatically scan them in. Some multiple-device IO device interconnect protocols define procedures by which other devices can be alerted when a new device is connected on to the interconnect or removed from the interconnect. Fibre FC-AL is an example of such an interconnect in which a LIP (Loop Initialization Primitive) of the type Loop Initialization No valid AL-PA LIP(F7,F7) is generated by the newly added device to inform other devices on the loop that a new device has been connected and that they should re-scan the bus. When a JBOD emulation SV subsystem incorporates this kind of IO device interconnect for some or all of the host-side interconnects, it is important that it, too, follow those same procedures to alert other devices on the interconnect when it is connected on to the interconnect. In the Fibre FC-AL case, if the device being added as mapped to a LUN (logical unit) of an ID that was not already presented on the loop, a LIP(F7,F7) will be issued onto the loop. For all host-side IO device interconnects that implement SCSI as the primary command protocol, which includes Fibre FC-AL, Parallel SCSI, iSCSI and Serial SCSI, on the addition (insertion) of a device in the JBOD emulation SV subsystem that is automatically mapped to an LUN or an existing ID, a sense key of "UNIT ATTENTION" would typically be posted with sense code of "REPORTED LUNS DATA HAS CHANGED".

In general, when the mapping of LMUs to the host-side IO device interconnect LUNs has changed, either when an LMU is newly introduced onto the Fibre loop or when an existing LMU is removed therefrom, the host entity will be informed of such change. An example of such JBOD emulation controller is that when the host-side IO device interconnect is a Fibre operating in Arbitrated Loop mode, while the external JBOD emulation controller can issue a LIP when a new target ID is introduced onto the Fibre loop or is removed from the Fibre loop so as to inform other devices on the loop that the loop device map has changed. Another example is that when the JBOD emulation controller support standard SCSI command set as a primary command interface with the host entity over the host-side IO device interconnect, the JBOD emulation controller posts a status of "CHECK CONDITION" to the host entity with sense key of "UNIT ATTENTION" and sense code of "REPORTED LUNS DATA HAS CHANGED" to inform the host entity when the mapping of LMUs to the host-side IO device interconnect LUNs has changed.

Another important characteristic of a JBOD subsystem is that the PSD presents itself in an identical way no matter where it resides inside the JBOD subsystem. In this way, the user does not have to keep track of the original location of PSDs and is free to move them around at will without fear that the host entity may misidentify them and inadvertently corrupt data on them by writing to the wrong PSDs. To emulate this characteristic, the present invention JBOD emulation controller 38 possesses the ability to properly identify the PSD 36 no matter where in the subsystem 34 the drive may reside so that it can present it as its original self to the host entity 32. This is what is commonly referred to as drive roaming.

Drive roaming is typically accomplished by storing identification and configuration information on the PSD 36 itself in a space specifically reserved for this purpose and that is otherwise not included in any combination of PSDs 36 to form a LMU and, therefore, not made accessible to the host entity 32. During system initialization, the JBOD emulation controller 38 reads this information and keeps it on hand to facilitate emulation. Should the JBOD emulation controller 38 detect, either automatically or by user dictate, that a new PSD 36 has been installed, perhaps as a replacement for a failed PSD 36, it will typically read the information from the new PSD 36 on line.

One weak point of storing this information to and reading it from the PSDs during initialization is the latency that results from waiting for PSDs to completely get themselves into a state in which media can be read. This can be especially long if PSDs are powered-up in a staggered fashion in order to minimize the current surge that might occur when multiple PSDs are powered up concurrently. This latency can cause compatibility issues with hosts that expect to be able to obtain PSD identification information, such as World-Wide-Name, within a period of time after power up that is less than this latency. Storing the information in non-volatile memory that has a low power-up latency, such as battery-backed-up SRAM or flash memory, can eliminate this latency together with these compatibility issues.

If a PSD whose identification information has already been stored to non-volatile memory as above has failed or is removed from the JBOD emulation SV subsystem while the subsystem is in a powered-down state and then the subsystem is subsequently powered up, during power-up initialization process and prior to being able to determine that the PSD is not present and/or its identification information not accessible, the SVC may present the original PSD's identification information to the host. Only after the SVC finally determines that the PSD is not present or no longer accessible will it discover that it has presented the wrong information to the host. At this point, the JBOD emulation SV subsystem would typically emulate a PSD removal in an attempt to alert the host that it should re-scan the PSD.

If a new PSD is inserted into a powered-down SV subsystem and the subsystem is subsequently powered up, the new PSDs identification information will still remain unavailable until the SVC is able to successfully read the information from the reserved space on the PSD, so a relatively extended latency will be incurred. If the PSD has never been configured before such that it does not have any identification or configuration information stored on it, the JBOD emulation SV subsystem may elect to ignore it, requiring that each usable PSD must be pre-configured (e.g., factory configured), or it may generate a set of identification and configuration information for the PSD and store it to reserved space on the PSD, at the same time, making a copy to non-volatile memory. If the newly inserted PSD does have identification and configuration information already written on it, then the appropriate information would be copied to non-volatile memory. If there was no previous identification information associated with the particular host-side interconnect ID/LUN, then the JBOD emulation SV subsystem would simply alert the host(s) to rescan the interconnect for new PSDs. If, on the other hand, the host-side interconnect ID/LUN to be associated with the new PSD is identical to the ID/LUN associated with a PSD that has been removed or otherwise is no longer active, the SVC may already have a record of the original PSD and associated identification information in non-volatile memory. During power-up initialization, prior to being able to successfully read the identification information off of the new PSD, the SVC may end up presenting the original PSD's identification information to the host. Only after the SVC finally reads the information off of the new PSD will it discover that it has presented the wrong information. At this point, the JBOD emulation SV subsystem would typically emulate a PSD removal followed by an insertion in an attempt to alert the host that it should re-scan the PSD.

In other embodiments of the present invention, the external JBOD emulation controller can further comprise an informing mechanism for informing the host entity when the mapping of said LMUs to host-side interconnect LUNs has changed. The external JBOD emulation controller can also comprise a notifying mechanism for having the host entity duly informed of a change in LMU mapping when LMU identification information presented to the host entity changes due to a discrepancy between information stored on the JBOD emulation controller and the actual identification information read off of the PSDs.

In other embodiment of the present invention, the JBOD subsystem can also comprise an unique ID determination mechanism to uniquely identify said PSDs independent of their location in which they are installed in the JBOD subsystem. wherein information used to uniquely identify each of said PSDs can be stored on the PSD. LMU identification and configuration information can be stored on the member PSDs that compose the LMU.

Another feature that PSDs often implement is dual-portedness in which the PSD presents itself to the host entity(s) in an identical fashion over two separate IO device interconnects. This feature is designed to allow the host entity the ability to maintain access to the PSD even if one of the interconnects breaks, becomes blocked or otherwise malfunctions, a feature referred to here as "redundant interconnect". To achieve this feature, the present invention JBOD emulation controller 38 presents each LMU to the host entity 32 in an identical fashion over two or more separate host-side IO device interconnects. Namely, LMUs presented to the host entity can be presented redundantly on more than one host-side IO device interconnect port.

Figure 16:
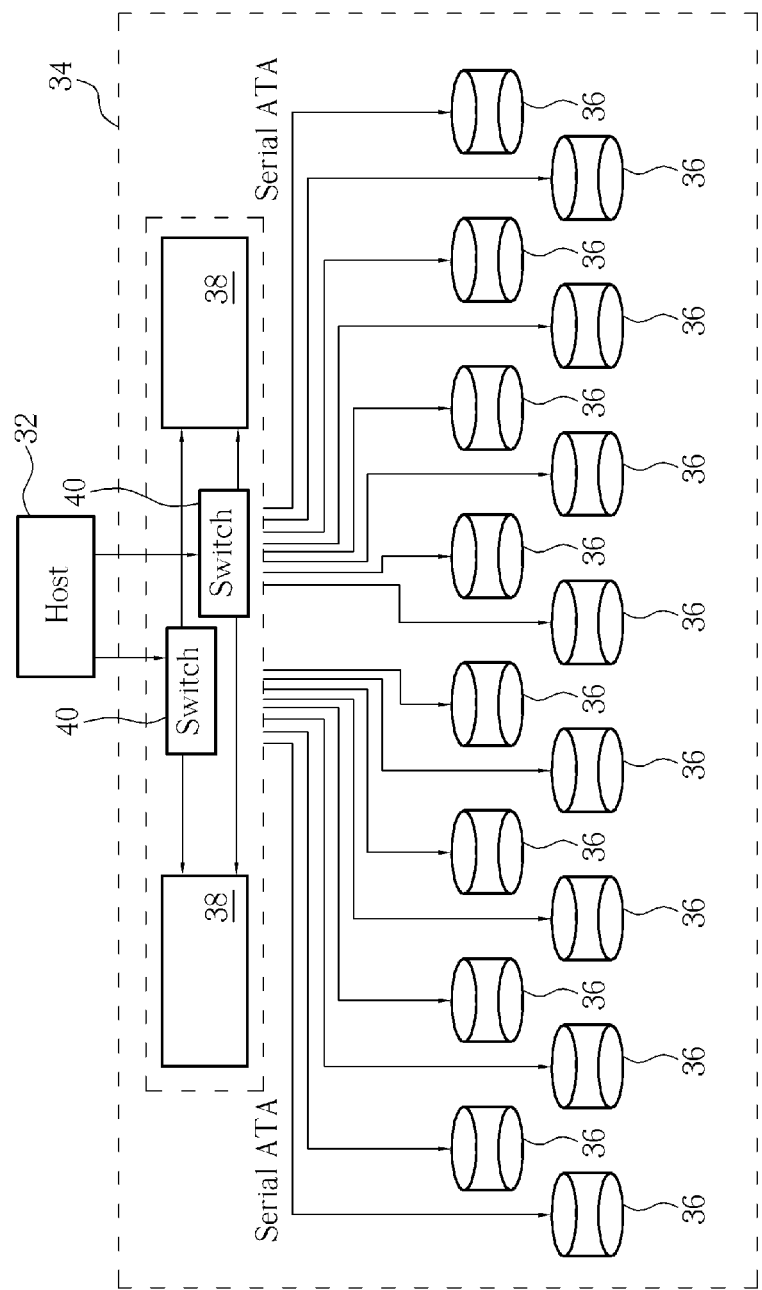
FIG. 16 is a block diagram of an implementation that uses a pair of present invention JBOD emulation controllers configured redundantly.

Please refer to FIG. 16. FIG. 16 shows a block diagram of an implementation that uses a pair of present invention JBOD emulation controllers 38 configured redundantly such that a malfunction of a single controller board, and especially of a single JBOD emulation controller 38, anywhere in the subsystem 34 will not result in loss of access to multiple PSDs 36. In this configuration, each JBOD emulation controller 38 is equipped with a pair of host ports each of which has a complementary port on the alternate JBOD emulation controller 38 to which it is interconnected.

Under normal operation, host entity(s) access LMUs through the JBOD emulation controller 38 to which they are assigned. If one JBOD emulation controller 38 were to malfunction, the LMUs that were originally assigned to the malfunctioning controller 38 are immediately reassigned to the normally-functioning controller 38 allowing the normally-functioning controller 38 to transparently take over the processing of host IO requests simply by presenting itself, together with all the reassigned LMUs, on each interconnect in way identical with what the malfunctioning controller 38 did prior to its failure. With this "transparent takeover" characteristic, the host entity 32 need not implement special functionality to make it aware of the JBOD emulation controller 38 malfunctioning and reroute IOs itself in response.

The two sets of complementary ports in turn form a redundant port complement. A host entity 32 that has two independent ports connected using two separate IO device interconnects to these two complementary redundant port sets then has two independent paths to each LMU over which it can issue IO requests. Should one of the ports on the host entity 32 or on a JBOD emulation controller 38 malfunction or should the IO device interconnect itself break or become blocked, the host entity 32 can reroute IO requests over the other redundant path. Alternately, when both paths are functioning normally, the host entity 32 could elect to issue IO requests over both paths in an effort to balance the load between the paths, a technique referred to as "load balancing".

Figure 17:
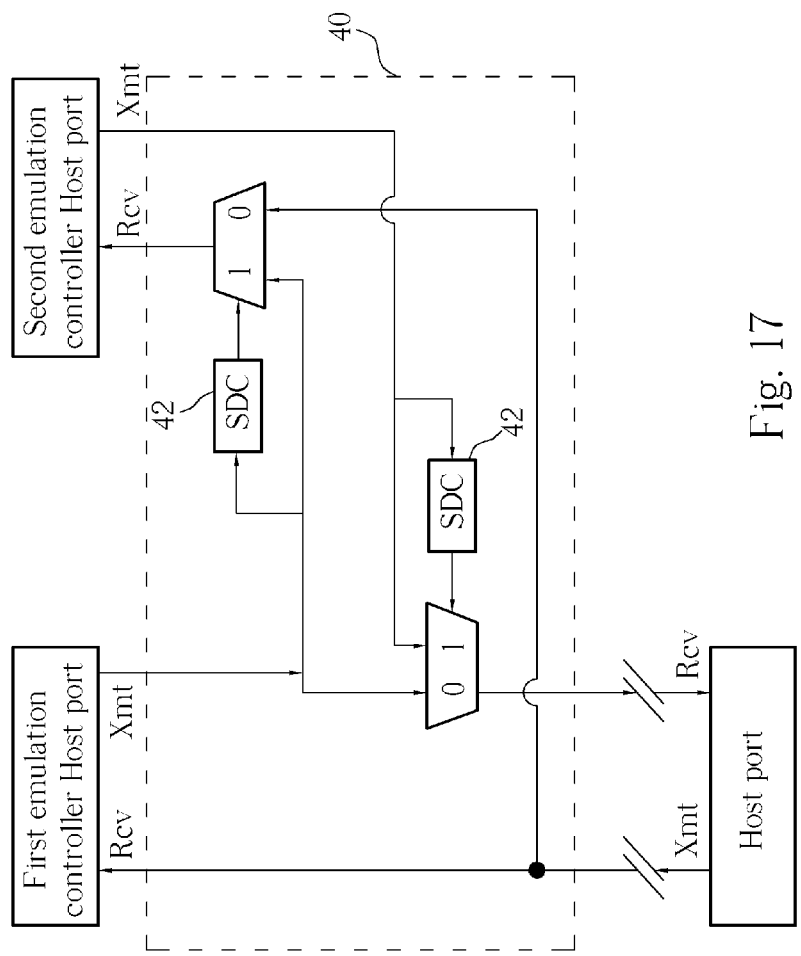
FIG. 17 is a block diagram of a switch circuit in FIG. 16 according to the present invention.

To achieve the transparent takeover functionality described above, each of the pair of ports, one on each JBOD emulation controller 38, that form a complementary port pair are physically interconnected. In this embodiment, switch circuits 40 are inserted to achieve the physical interconnection required. FIG. 17 shows an example of a switch circuit 40 that could be used to accomplish this interconnection for Fibre interconnects in which hardware signal detection circuits (SDCs) 42 are used to activate the switch state changes.

Figure 18:
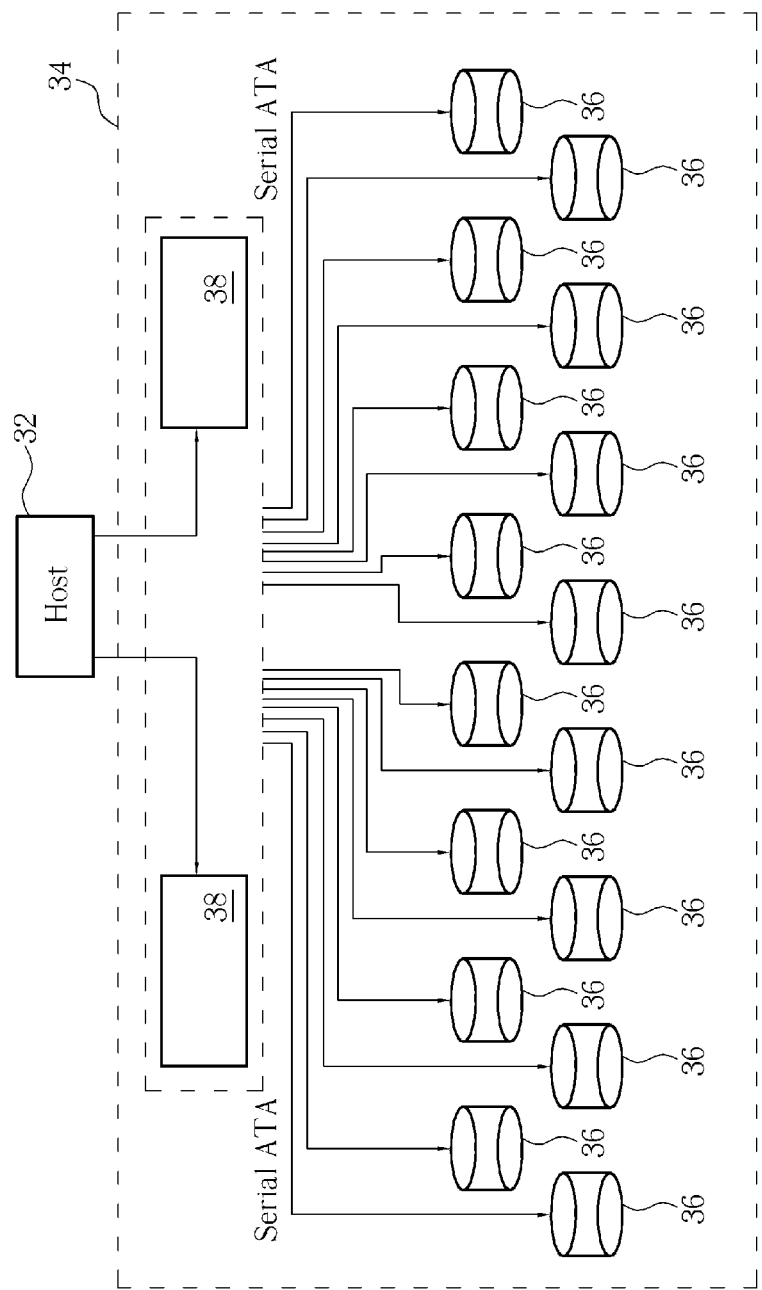
FIG. 18 is a block diagram of another implementation that uses a pair of present invention JBOD emulation controller configured redundantly.

An alternate host-side interconnect configuration that requires fewer interconnects eliminates the need for switch circuitry to achieve similar levels of redundancy is shown in FIG. 18. Note that host-side interconnects connecting a JBOD emulation controller 38 to the host entity 32 are not interconnected to the alternate controller 38. In this configuration, interconnect redundancy is achieved by making each LMU accessible to the host entity 32 over a host-side interconnect by one JBOD emulation controller 38 also accessible through an alternate host-side interconnect on the alternate JBOD emulation controller 38. Should one of the interconnects break, become blocked, or otherwise malfunction, the host entity 32 will still be able to access the LMU through the alternate JBOD emulation controller 38 via the alternate interconnect. Similarly, should one of the JBOD emulation controllers 38 malfunction, the other controller 38 could take over and, once again, the host entity 32 will still be able to access each LMU through the normally-functioning JBOD emulation controller 38 via the alternate interconnect.

Yet another feature of a JBOD subsystem is enclosure management services (EMS). This is an intelligent circuitry that monitors status of various enclosure devices, such as power supplies, fans, temperatures, etc. and can be interrogated by a host for these statuses. In an actual JBOD subsystem, the protocols typically used to interrogate the devices managed and monitored by the enclosure management services module are defined in the standard SCSI command protocol and, therefore, can be transported over any IO device interconnect that supports the transport of SCSI command protocol, such as Parallel SCSI, Fibre, SAS, iSCSI, etc.

In order to enhance compatibility with a host entity that is designed to interface with conventional JBOD subsystems, the JBOD subsystem 34 of the present invention that is equipped with the EMS circuit 390 is capable of supporting one or more standard SCSI EMS management protocols and one or both of the connection configurations "direct-connect" and "device-forwarded".

For direct-connect emulations, the JBOD emulation controller 38 presents the EMS services on a host-side IO device interconnect as one or more ID/LUNs. The EMS may have dedicated interconnect IDs assigned to it or it may simply have assigned to it LUNs on IDs that already present other LUNs. For SAF-TE emulations, the JBOD emulation controller 38 must present EMS SAF-TE device(s) on dedicated IDs. For direct-connect SES emulations, the EMS SES device(s) could be presented on dedicated IDs or on IDs presenting other LUNs. For device-forwarded emulations, the JBOD emulation controller 38 simply includes information in the INQUIRY string of the virtual PSDs responsible for forwarding the EMS management requests that indicates to the host entity 32 that one of the functions of the said PSD is to forward such requests to the EMS. Typically, multiple virtual PSDs, and maybe even all of the virtual PSDs presented on the interconnect will be presented as forwarders of EMS management requests so that the absence or failure of one or more virtual PSDs will not result in loss of access to the EMS.

In an optional embodiment, the JBOD emulation controller can also be configured to support SES enclosure management services protocol or SAF-TE enclosure management services protocol.

In contrast to the prior art, the present invention JBOD subsystem utilizes relatively low-cost point-to-point serial-signal PSDs, such as Serial ATA HDDs, to provide storage capacity to a host entity while performing the functionalities of a conventional JBOD subsystem, for example, JBOD subsystems incorporating Parallel SCSI or Fibre PSDs.

Those skilled in the art will readily observe that numerous modifications and alterations of the device may be made while retaining the teachings of the invention. Accordingly, that above disclosure should be construed as limited only by the metes and bounds of the appended claims.

What is claimed is:
1. A computer system comprising:
  a host entity for issuing IO requests;
  an external JBOD (just a bunch of disks) emulation controller coupled to the host entity for emulating IO operations in response to the IO requests; and
  a group of physical storage devices (PSDs) coupled to the JBOD emulation controller each through a point-to-point serial-signal interconnect for providing storage to the computer system through the JBOD emulation controller in which each of the PSDs is a hard disk drive (HDD) or a solid state drive (SSD), wherein
said JBOD emulation controller defines at least one logical media unit (LMU) comprising sections of said group of PSDs, and is configured to provide a mapping that maps combination of the sections of said group of PSDs to the at least one LMU visible to the host entity, and the at least one LMU is contiguously addressable by the host entity to which the at least one LMU is made available, and said JBOD emulation controller performs the following functions:
bringing the whole LMU on line such that the whole LMU is accessible by the host entity, while the JBOD emulation controller is on line, and while a requisite quorum of said PSDs becomes on-line, in which the requisite quorum refers to said group of PSDs of the whole LMU data of which is accessible correctly by the JBOD emulation controller while at least one PSD of said PSDs is inaccessible; and
taking the whole LMU off line such that the whole LMU is inaccessible by the host entity, while the JBOD emulation controller is on line, and while all the requisite quorum of said PSDs is not on line, in which on line PSDs of said PSDs are less than the requisite quorum of said PSDs;
wherein said external JBOD emulation controller comprises
  a central processing circuitry for performing said IO operations in response to said IO requests of said host entity;
  at least one IO device interconnect controller coupled to said central processing circuitry;
  at least one host-side IO device interconnect port provided in one of said at least one IO device interconnect controller for coupling to said host entity; and
  at least one device-side IO device interconnect port provided in one of said at least one IO device interconnect controller for coupling to one of said PSDs; and wherein the IO requests are parsed to determine what operation is to be performed and on which sections of the LMU the operation is to be performed;
wherein when the operation comprises internally-emulated, asynchronous device sub-operations, then the JBOD emulation controller executes the associated sub-operations including transferring any associated data to/from the host entity; and
wherein when there is a failed operation, the JBOD emulation controller generates a status report and responds to the host entity with the status report indicating that the operation failed.

2. The computer system of claim 1 wherein the point-to-point serial-signal interconnect is a Serial ATA IO device interconnect.

3. The computer system of claim 1 wherein the point-to-point serial-signal interconnect is a Serial-Attached SCSI (SAS) IO device interconnect.

4. The computer system of one of claims 1 through 3, wherein said LMU are presented redundantly to the host entity on more than one host-side IO device interconnect port in order to make the host entity maintain access to the PSD even if one of the interconnects breaks, becomes blocked or malfunctions.

5. The computer system of one of claims 1 through 3, further comprises a second external JBOD emulation controller coupled to the host entity for emulating IO operations in response to the IO requests, wherein said external JBOD emulation controller and said second external JBOD emulation controller are configured into a redundant pair, and said LMU is allowed to be brought on line or taken off line while the JBOD emulation controller is on line.

6. The computer system of claim 5, wherein said LMU is redundantly presented to the host by both of said external JBOD emulation controllers.

7. The computer system of claim 1 wherein said external JBOD emulation controller is configured for accommodating said group of PSDs of different serial protocols.

8. The computer system of claim 7 wherein said group of PSDs are received in a plurality of enclosures.

9. The computer system of claim 1 wherein said external JBOD emulation controller issues a device-side IO request to said IO device interconnect controller, and said IO device interconnect controller re-formats said device-side IO request and accompanying IO data into at least one data packet for transmission to said group of PSDs through said device-side IO device interconnect port, wherein said data packet comprises a start segment at the beginning indicating the start of said data packet, an end segment at the end indicating the end of the data packet, a payload data segment containing actual IO information to transmit through the SAS device-side IO device interconnect port, and a check data segment containing check codes derived from said payload for checking the correctness of said payload data after transmission.

10. The computer system of claim 1, further comprising an enclosure management services mechanism that is implemented using an intelligent circuitry which includes a CPU and runs a software program for managing and monitoring devices belonging to the computer system.

11. The computer system of claim 1, wherein when the operation comprises a synchronous device sub-operation, a device-side IO request is generated and issued to appropriate PSDs in response.

12. The computer system of claim 1 further comprising a load balancing function over two paths between the host entity and JBOD emulation controller, so that when the two paths between the host entity and JBOD emulation controller function normally, the host entity will elect to issue IO requests over the two paths between the host entity and JBOD emulation controller so as to achieve the load balancing function.

13. A JBOD (just a bunch of disks) subsystem for providing storage to a host entity, comprising:
at least one external JBOD emulation controller for coupling to the host entity for emulating IO operations in response to IO requests issued from the host entity; and
a group of PSDs each coupled to the JBOD emulation controller through a point-to-point serial-signal interconnect for providing storage to the host entity through the JBOD emulation controller in which each of the PSDs is a hard disk drive (HDD) or a solid state drive (SSD), wherein
said JBOD emulation controller defines at least one logical media unit (LMU) comprising sections of said group of PSDs, and is configured to provide a mapping that maps combination of the sections of said group of PSDs to the at least one LMU visible to the host entity, and the at least one LMU is contiguously addressable by the host entity to which the at least one LMU is made available, and said JBOD emulation controller performs the following functions:
bringing said whole LMU on line such that the whole LMU is accessible by the host entity, while the JBOD emulation controller is on line, and while a requisite quorum of said PSDs becomes on-line, in which the requisite quorum refers to said group of PSDs of the whole LMU data of which is accessible correctly by the JBOD emulation controller while at least one PSD of said PSDs is inaccessible; and
taking said whole LMU off line such that the whole LMU is inaccessible by the host entity, while the JBOD emulation controller is on line, and while all the requisite quorum of said PSDs is not on line, in which on line PSDs of said PSDs are less than the requisite quorum of said PSDs;
wherein said external JBOD emulation controller comprises
a central processing circuitry for performing said IO operations in response to said IO requests of said host entity;
at least one IO device interconnect controller coupled to said central processing circuitry;
at least one host-side IO device interconnect port provided in one of said at least one IO device interconnect controller for coupling to said host entity; and
at least one device-side IO device interconnect port provided in one of said at least one IO device interconnect controller for coupling to one of said PSDs; and
wherein the IO requests are parsed to determine what operation is to be performed and on which sections of the LMU the operation is to be performed;
wherein when the operation comprises internally-emulated, asynchronous device sub-operations, then the JBOD emulation controller executes the associated sub-operations including transferring any associated data to/from the host entity; and
wherein when there is a failed operation, the JBOD emulation controller generates a status report and responds to the host entity with the status report indicating that the operation failed.

14. The JBOD subsystem of claim 13 wherein the point-to-point serial-signal interconnect is a Serial ATA IO device interconnect.

15. The JBOD subsystem of claim 13 wherein the point-to-point serial-signal interconnect is a Serial-Attached SCSI (SAS) IO device interconnect.

16. The JBOD subsystem of one of claims 13 through 15, further comprising auto-on-lining mechanism to automatically bring on line one of said LMU which was previously off-line once the requisite quorum of said PSDs becomes on-line.

17. The JBOD subsystem of one of claims 13 through 15, further comprising auto-off-lining mechanism to automatically take off line one of said LMU which was previously on-line once the requisite quorum of said PSDs becomes off-line.

18. The JBOD subsystem of one of claims 13 through 15, further comprising determining mechanism for automatically determining when one of said PSDs has been removed or when one has been inserted.

19. The JBOD subsystem of one of claims 13 through 15, further comprising scanning-in mechanism to automatically scan in PSDs on detection of insertion of the PSDs.

20. The JBOD subsystem of one of claims 13 through 15, further comprising informing mechanism for informing the host entity when the mapping of said LMUs to host-side interconnect LUNs has changed.

21. The JBOD subsystem of one of claims 13 through 15, further comprising unique ID determination mechanism to uniquely identify said PSDs independent of their location in which they are installed in the JBOD subsystem.

22. The JBOD subsystem of claim 21, wherein information used to uniquely identify each of said PSDs is stored on said PSDs.

23. The JBOD subsystem of one of claims 13 through 15, wherein LMU identification and configuration information is stored on the member PSDs that compose the LMU.

24. The JBOD subsystem of claim 23, wherein LMU identification information presented to the host entity is generated from said LMU identification information stored on the member PSDs that compose the LMU.

25. The JBOD subsystem of one of claims 13 through 15, wherein LMU identification information presented to the host entity is generated from information stored in a non-volatile memory in the JBOD emulation controller.

26. The JBOD subsystem of one of claims 13 through 15, wherein LMU identification information presented to the host entity is generated as follows: from information stored in a non-volatile memory in the JBOD subsystem prior to being able to obtain LMU identification information off of the member PSDs and from LMU identification information stored on the member PSDs that compose the LMU after the member PSDs become accessible.

27. The JBOD subsystem of one of claims 13 through 15, wherein a first and a second of said at least one JBOD emulation controller are configured into a redundant pair, whereby when the first JBOD emulation controller goes off line or is taken off line, the second JBOD emulation controller will take over the functionality of the first JBOD emulation controller.

28. The JBOD subsystem of claim 27, wherein a host-side port of said first JBOD emulation controller and a host-side port of said second JBOD emulation controller are configured into a complementary port pair.

29. The JBOD subsystem of claim 28, wherein said complementary port pair are interconnected onto a same host-side IO device interconnect.

30. The JBOD subsystem of claim 29, wherein said complementary port pair are interconnected together with switch circuitry.

31. The JBOD subsystem of claim 28, wherein each port of said complementary port pair is interconnected onto a different host-side IO device interconnect.

32. The JBOD subsystem of claim 27, wherein one of said LMU is presented to the host entity through both said first and said second JBOD emulation controllers.

33. The JBOD subsystem of one of claims 13 through 15, further comprising ID generation mechanism to automatically generate the LMU identification information presented to the host entity when a need arises.

34. The JBOD subsystem of one of claims 13 through 15 wherein said LMU are presented redundantly to the host entity on more than one host-side IO device interconnect port in order to make the host entity maintain access to the PSD even if one of the interconnects breaks, becomes blocked or malfunctions.

35. The JBOD subsystem of one of claims 13 through 15, further comprising an enclosure management services (EMS) mechanism that is implemented using an intelligent circuitry which includes a CPU and runs a software program for managing and monitoring devices belonging to the JBOD subsystem.

36. The JBOD subsystem of claim 35, wherein said EMS mechanism is of a direct-connect EMS configuration.

37. The JBOD subsystem of claim 35, wherein said EMS mechanism is of a device-forward EMS configuration.

38. The JBOD subsystem of claim 35, wherein said EMS mechanism implements both direct-connect and device-forward EMS configurations.

39. The JBOD subsystem of claim 35, wherein said JBOD emulation controller is configured to support SES (SCSI Enclosure Services) enclosure management services protocol.

40. The JBOD subsystem of claim 35, wherein said JBOD emulation controller is configured to support SAF-TE (SCSI Accessed Fault-Tolerant Enclosure) enclosure management services protocol.

41. The JBOD subsystem of one of claims 13 through 15, wherein at least one said host-side IO device interconnect port is Fibre Channel supporting point-to-point connectivity in target mode.

42. The JBOD subsystem of one of claims 13 through 15, wherein at least one said host-side IO device interconnect port is Fibre Channel supporting public loop connectivity in target mode.

43. The JBOD subsystem of one of claims 13 through 15, wherein at least one said host-side IO device interconnect port is Fibre Channel supporting private loop connectivity in target mode.

44. The JBOD subsystem of one of claims 13 through 15, wherein at least one said host-side IO device interconnect port is parallel SCSI operating in target mode.

45. The JBOD subsystem of one of claims 13 through 15, wherein at least one said host-side IO device interconnect port is ethernet supporting the iSCSI protocol operating in target mode.

46. The JBOD subsystem of one of claims 13 through 15, wherein at least one said host-side IO device interconnect port is Serial-Attached SCSI (SAS) operating in target mode.

47. The JBOD subsystem of one of claims 13 through 15, wherein at least one said host-side IO device interconnect port is Serial ATA operating in target mode.

48. The JOBD subsystem of claim 13 wherein said JBOD emulation controller is configured for accommodating said group of PSDs of different serial protocols.

49. The JOBD subsystem of claim 48 wherein said group of PSDs are received in a plurality of enclosures.

50. The JOBD subsystem of claim 13 wherein said external JBOD emulation controller issues a device-side IO request to said IO device interconnect controller, and said IO device interconnect controller re-formats said device-side IO request and accompanying IO data into at least one data packet for transmission to said group of PSDs through said device-side IO device interconnect port, wherein said data packet comprises a start segment at the beginning indicating the start of said data packet, an end segment at the end indicating the end of the data packet, a payload data segment containing actual IO information to transmit through the SAS device-side IO device interconnect port, and a check data segment containing check codes derived from said payload for checking the correctness of said payload data after transmission.

51. The JBOD subsystem of claim 13, wherein when the operation comprises a synchronous device sub-operation, a device-side IO request is generated and issued to appropriate PSDs in response.

52. The JBOD subsystem of claim 13 further comprising a load balancing function over two paths between the host entity and JBOD emulation controller, so that when the two paths between the host entity and JBOD emulation controller function normally, the host entity will elect to issue IO requests over the two paths between the host entity and JBOD emulation controller so as to achieve the load balancing function.

53. A method for performing JBOD (just a bunch of disks) emulation in a computer system having at least one external JBOD emulation controller and a group of physical storage devices (PSDs) connected to the JBOD emulation controller, the method comprising:
   defining at least one logical media unit (LMU) comprising sections of said group of PSDs by the JBOD emulation controller;
   receiving and parsing IO requests from a host entity by the JBOD emulation controller to perform an IO operation to access the LMU by accessing said group of PSDs through at least one device-side IO device interconnect port in point-to-point serial signal transmission; and
   performing the following functions:
   bringing said whole LMU on line such that the whole LMU is accessible by the host entity, while the JBOD emulation controller is on line, and while a requisite quorum of said PSDs becomes on-line, in which the requisite quorum refers to said group of PSDs of the whole LMU data of which is accessible correctly by the JBOD emulation controller while at least one PSD of said PSDs is inaccessible; and
   taking said whole LMU off line such that the whole LMU is inaccessible by the host entity, while the JBOD emulation controller is on line, and while all the requisite quorum of said PSDs is not on line, in which on line PSDs of said PSDs are less than the requisite quorum of said PSDs;
   the JBOD emulation controller is configured to provide a mapping that maps combination of the sections of said group of PSDs to the at least one LMU visible to the host entity, and the at least one LMU is contiguously addressable by the host entity to which the at least one LMU is made available;
   wherein said external JBOD emulation controller comprises
      a central processing circuitry for performing said IO operation in response to said IO requests of said host entity;

at least one IO device interconnect controller coupled to said central processing circuitry;

at least one host-side IO device interconnect port provided in one of said at least one IO device interconnect controller for coupling to said host entity; and at least one device-side IO device interconnect port provided in one of said at least one IO device interconnect controller for coupling to one of said PSDs in which each of the PSDs is a hard disk drive (HDD) or a solid state drive (SSD); and wherein the IO requests are parsed to determine what operation is to be performed and on which sections of the LMU the operation is to be performed;

wherein when the operation comprises internally-emulated, asynchronous device sub-operations, then the JBOD emulation controller executes the associated sub-operations including transferring any associated data to/from the host entity; and wherein when there is a failed operation, the JBOD emulation controller generates a status report and responds to the host entity with the status report indicating that the operation failed.

54. The method of claim 53 wherein the device-side IO device interconnect port is a Serial ATA IO device interconnect port.

55. The method of claim 53 wherein the device-side IO device interconnect port is a Serial-Attached SCSI (SAS) IO device interconnect port.

56. The method of one of claims 53 through 55 further comprising: while the JBOD emulation controller is on line, bringing on line one of said at least one LMU which is not on line.

57. The method of one of claims 53 through 55 further comprising: while the JBOD emulation controller is on line, taking off line one of said at least one LMU which is on line.

58. The method of claim 53, further comprising automatically bringing on line one of said LMU which was previously off-line on detection of insertion of one of said PSDs associated with said LMU.

59. The method of claim 53, further comprising automatically taking off line one of said LMU which was previously on-line on detection of off-lining of all PSDs associated with said LMU.

60. The method of claim 57, wherein said at least one host-side IO device interconnect port supports one of the following: Fibre Channel supporting point-to-point connectivity in target mode, Fibre Channel supporting public loop connectivity in target mode, Fibre Channel supporting private loop connectivity in target mode, parallel SCSI operating in target mode, ethernet supporting the iSCSI protocol operating in target mode, Serial-Attached SCSI (SAS) operating in target mode, and Serial ATA operating in target mode.

61. The method of claim 53 wherein said JBOD emulation controller is configured for accommodating said group of PSDs of different serial protocols.

62. The method of claim 61 wherein said group of PSDs are received in a plurality of enclosures.

63. The method of claim 53 wherein said external JBOD emulation controller issues a device-side IO request to said IO device interconnect controller, and said IO device interconnect controller re-formats said device-side IO request and accompanying IO data into at least one data packet for transmission to said group of PSDs through said device-side IO device interconnect port, wherein said data packet comprises a start segment at the beginning indicating the start of said data packet, an end segment at the end indicating the end of the data packet, a payload data segment containing actual IO information to transmit through the SAS device-side IO device interconnect port, and a check data segment containing check codes derived from said payload for checking the correctness of said payload data after transmission.

64. The method of claim 53, further comprising an enclosure management services mechanism that is implemented using an intelligent circuitry which includes a CPU and runs a software program for managing and monitoring devices belonging to the computer system.

65. The method of claim 53, wherein when the operation comprises a synchronous device sub-operation, a device-side IO request is generated and issued to appropriate PSDs in response.

66. The method of claim 53 further comprising a load balancing function over two paths between the host entity and JBOD emulation controller, so that when the two paths between the host entity and JBOD emulation controller function normally, the host entity will elect to issue IO requests over the two paths between the host entity and JBOD emulation controller so as to achieve the load balancing function.

67. A non-transitory computer-readable storage medium having a computer program code stored therein that causes a computer system having an external JBOD (just a bunch of disks) emulation controller and a group of physical storage devices (PSDs) connected to the JBOD emulation controller to perform the steps of:

defining at least one logical medium unit comprising sections of said PSDs by the JBOD emulation controller; and receiving and parsing IO requests from a host entity by the JBOD emulation controller to perform an IO operation to access the logical media unit (LMU) by accessing said group of PSDs through at least one device-side IO device interconnect in point-to-point serial signal transmission, wherein said JBOD emulation controller performs the following functions:

bringing the whole LMU on line such that the whole LMU is accessible by the host entity, while the JBOD emulation controller is on line, and while a requisite quorum of said PSDs becomes on-line, in which the requisite quorum refers to said group of PSDs of the whole LMU data of which is accessible correctly by the JBOD emulation controller while at least one PSD of said PSDs is inaccessible; and taking the whole LMU off line such that the whole LMU is inaccessible by the host entity, while the JBOD emulation controller is on line, and while all the requisite quorum of said PSDs is not on line, in which on line PSDs of said PSDs are less than the requisite quorum of said PSDs, and the JBOD emulation controller is configured to provide a mapping that maps combination of the sections of said group of PSDs to the at least one LMU visible to the host entity, and the at least one LMU is contiguously addressable by the host entity to which the at least one LMU is made available;

wherein said external JBOD emulation controller comprises a central processing circuitry for performing said IO operation in response to said IO requests of said host entity;

at least one IO device interconnect controller coupled to said central processing circuitry;

at least one host-side IO device interconnect port provided in one of said at least one IO device interconnect controller for coupling to said host entity; and at least one device-side IO device interconnect port provided in one of said at least one IO device interconnect controller for coupling to one of said PSDs in which each of the PSDs is a hard disk drive (HDD) or a solid state drive (SSD); and wherein the IO requests are parsed to determine what operation is to be performed and on which sections of the LMU the operation is to be performed;

wherein when the operation comprises internally-emulated, asynchronous device sub-operations, then the JBOD emulation controller executes the associated sub-operations including transferring any associated data to/from the host entity; and wherein when there is a failed operation, the JBOD emulation controller generates a status report and responds to the host entity with the status report indicating that the operation failed.

68. The non-transitory computer-readable storage medium of claim 67 wherein the device-side IO device interconnect is a Serial ATA IO device interconnect.

69. The non-transitory computer-readable storage medium of claim 67 wherein the device-side IO device interconnect is a Serial-Attached SCSI (SAS) IO device interconnect.

70. The non-transitory computer-readable storage medium of claim 67 wherein said at least one external JBOD emulation controller is configured for accommodating said group of PSDs of different serial protocols.

71. The non-transitory computer-readable storage medium of claim 70 wherein said group of PSDs are received in a plurality of enclosures.

72. The non-transitory computer-readable storage medium of claim 67 wherein said external JBOD emulation controller issues a device-side IO request to said IO device interconnect controller, and said IO device interconnect controller re-formats said device-side IO request and accompanying IO data into at least one data packet for transmission to said group of PSDs through said device-side IO device interconnect port, wherein said data packet comprises a start segment at the beginning indicating the start of said data packet, an end segment at the end indicating the end of the data packet, a payload data segment containing actual IO information to transmit through the SAS device-side IO device interconnect port, and a check data segment containing check codes derived from said payload for checking the correctness of said payload data after transmission.

73. The non-transitory computer-readable storage medium of claim 67, further comprising an enclosure management services mechanism that is implemented using an intelligent circuitry which includes a CPU and runs a software program for managing and monitoring devices belonging to the computer subsystem.

74. The non-transitory computer-readable storage medium of claim 67, wherein when the operation comprises a synchronous device sub-operation, a device-side IO request is generated and issued to appropriate PSDs in response.

75. The non-transitory computer-readable storage medium of claim 67 further comprising a load balancing function over two paths between the host entity and JBOD emulation controller, so that when the two paths between the host entity and JBOD emulation controller function normally, the host entity will elect to issue IO requests over the two paths between the host entity and JBOD emulation controller so as to achieve the load balancing function.

* * * * *